US012539529B2

(12) United States Patent
Bluestone et al.

(10) Patent No.: US 12,539,529 B2
(45) Date of Patent: Feb. 3, 2026

(54) COMBINATION PARTS JET WASHER AND SINK WASHER WITH PARTS WASHER WITH MINIMUM GRIP SPROCKET DRIVE SYSTEM

(71) Applicants: Ronald Bluestone, Lake Havasu City, AZ (US); Ryan Bluestone, Lake Havasu City, AZ (US)

(72) Inventors: Ronald Bluestone, Lake Havasu City, AZ (US); Ryan Bluestone, Lake Havasu City, AZ (US)

( * ) Notice: Subject to any disclaimer, the term of this patent is extended or adjusted under 35 U.S.C. 154(b) by 171 days.

(21) Appl. No.: 18/426,082

(22) Filed: Jan. 29, 2024

(65) Prior Publication Data

US 2024/0326099 A1 Oct. 3, 2024

Related U.S. Application Data

(60) Provisional application No. 63/441,832, filed on Jan. 29, 2023.

(51) Int. Cl.
*B08B 3/02* (2006.01)
*B08B 1/12* (2024.01)
(Continued)

(52) U.S. Cl.
CPC .................. *B08B 3/02* (2013.01); *B08B 1/12* (2024.01); *B08B 3/10* (2013.01); *B08B 13/00* (2013.01);
(Continued)

(58) Field of Classification Search
CPC .. B08B 3/02; B08B 3/10; B08B 3/006; B08B 1/12; B08B 13/00; B08B 2203/027; B08B 2203/0282; B08B 2203/007; B08B 2203/0223; F16H 7/06; F16H 2007/087; F16H 2007/0806
See application file for complete search history.

(56) References Cited

U.S. PATENT DOCUMENTS 1,222,625 A 4/1917 Hay
2,675,012 A * 4/1954 Scales .................... B08B 3/006
134/91
(Continued)

FOREIGN PATENT DOCUMENTS

EP 2415532 A1 * 2/2012 ............. B08B 3/006
GB 2478745 A * 9/2011 ............... B08B 3/10
(Continued)

*Primary Examiner* — Benjamin L Osterhout
(74) *Attorney, Agent, or Firm* — PAUL B. HEYNSSENS ATTORNEY AT LAW P.L.C.

(57) ABSTRACT

A combination sink and jet parts washer utilizing a minimum grip sprocket driving a rotating parts basket, for cleaning mechanical parts of oil, grease and contaminants. The washer has a cabinet which has a jet cleaning section, including the rotating parts basket. The basket is driven by a minimum grip sprocket drive mechanism. A parts basket in the jet cleaning section receives the parts which are cleaned by a spray from a spray manifold. The manifold is connected to a fluid pump which has its inlet communicating with the reservoir. A sink is positioned on the top of the cabinet and opens to access the jet washer and reservoir. In the closed position, the sink covers the top of the cabinet and may be used as a sink washer using the attached brush.

20 Claims, 19 Drawing Sheets

Third Drive Mechanism 900

(51) Int. Cl.

| | |
|---|---|
| ***B08B 3/10*** | (2006.01) |
| ***B08B 13/00*** | (2006.01) |
| ***F16H 7/06*** | (2006.01) |
| ***F16H 7/08*** | (2006.01) |
| *B08B 3/00* | (2006.01) |

(52) U.S. Cl.

CPC ................ *F16H 7/06* (2013.01); *B08B 3/006* (2013.01); *B08B 2203/007* (2013.01); *B08B 2203/0223* (2013.01); *B08B 2203/027* (2013.01); *B08B 2203/0282* (2013.01); *F16H 2007/0806* (2013.01); *F16H 2007/087* (2013.01)

(56) References Cited

U.S. PATENT DOCUMENTS

| | | | | | |
|---|---|---|---|---|---|
| 2,897,830 | A * | 8/1959 | Palmer | B08B 3/006 | 134/99.1 |
| 3,487,706 | A | 1/1970 | Resener | | |
| 3,890,988 | A * | 6/1975 | Lee | B08B 3/006 | 134/40 |
| 4,143,669 | A * | 3/1979 | Minkin | B08B 3/02 | 134/153 |
| 5,368,053 | A * | 11/1994 | Wilson | B08B 3/06 | 134/135 |
| 5,398,708 | A * | 3/1995 | Sheldon | B08B 3/022 | 134/91 |
| 5,640,981 | A * | 6/1997 | Niemela | B08B 3/02 | 49/40 |
| 6,019,110 | A * | 2/2000 | McClure | B08B 3/006 | 134/108 |
| 6,158,450 | A * | 12/2000 | Painter | B08B 3/045 | 134/145 |
| 6,267,249 | B1 | 7/2001 | Carpenter | | |
| 6,568,409 | B1 * | 5/2003 | Fleck | B08B 3/12 | 134/186 |
| 7,128,075 | B2 * | 10/2006 | Publ | B08B 3/006 | 134/107 |
| 7,484,515 | B1 * | 2/2009 | Bluestone | B08B 3/006 | 134/131 |
| 7,740,711 | B2 * | 6/2010 | Porter | B08B 3/006 | 134/108 |
| 8,297,291 | B1 * | 10/2012 | Bluestone | B08B 1/40 | 134/91 |
| 8,763,619 | B2 * | 7/2014 | Lele | B08B 3/10 | 134/147 |
| 9,933,040 | B2 | 4/2018 | Junker | | |
| 10,295,027 | B2 * | 5/2019 | Izutsu | F02B 67/04 | |
| 10,557,385 | B2 | 2/2020 | Pritchard | | |
| 11,867,274 | B2 | 1/2024 | Hobbs | | |
| 2002/0017314 | A1 * | 2/2002 | McClure | B08B 3/006 | 134/10 |
| 2010/0307544 | A1 * | 12/2010 | Lele | B08B 3/006 | 134/137 |
| 2014/0137904 | A1 * | 5/2014 | Suarez | B08B 3/14 | 134/109 |
| 2017/0167570 | A1 | 6/2017 | Junker | | |
| 2017/0314653 | A1 | 11/2017 | Izutsu | | |
| 2018/0161827 | A1 * | 6/2018 | Jasper | B08B 13/00 | |
| 2019/0010837 | A1 | 1/2019 | Pritchard | | |
| 2020/0040979 | A1 | 2/2020 | Akanishi | | |
| 2020/0331036 | A1 * | 10/2020 | McHaffie | B08B 3/045 | |
| 2021/0277986 | A1 | 9/2021 | Hobbs | | |

FOREIGN PATENT DOCUMENTS

| | | | | |
|---|---|---|---|---|
| GB | 2569115 | A * | 6/2019 | C11D 3/3738 |
| JP | H0957223 | A * | 3/1997 | |
| WO | WO-0024533 | A1 * | 5/2000 | B08B 3/006 |
| WO | WO-2013054125 | A1 * | 4/2013 | B08B 3/006 |

* cited by examiner

COMBINATION PARTS JET WASHER AND SINK WASHER WITH PARTS WASHER WITH MINIMUM GRIP SPROCKET DRIVE SYSTEM

TECHNICAL FIELD

The present invention relates generally to an apparatus for washing articles and more particularly relates to a combination sink washer and jet washer apparatus for washing articles such as automotive parts to remove grease, oil and other contaminants, preferably using a washing fluid which consists of a non-solvent based, non-flammable, biodegradable and environmentally acceptable washing solution.

BACKGROUND

Exemplary, parts washers, such as sinks, cabinets, and the like, are often used in machine shops, manufacturing, automotive transmission, and engine repair shops. Also used in cleaning are soak tanks. Soak tanks are vessels containing a solvent, such as a mixture of water and detergent, which may take hours to "soften" the built-up road grime, fluids, tars, and oils enough to be manually rinsed off prior to disassembly and repair. Heating the solution and brushing can aid in loosening dirt and grime.

Gasoline, diesel fuel, and kerosene were commonly used to clean and degrease parts. Later, chlorinated solvents used in vapor degreasers were common. Environmental concerns led to the banning of chlorinated solvents for parts cleaning, which lead back to aqueous-based cleaning systems, but with improvements. Hydraulic sprays may be used to improve the cleaning of parts by directing a pressurized solvent stream at a part from nozzles typically placed in fixed locations, as is the case in manufacturing, so that spray may applied where needed to effectuate cleaning.

Typically a parts washer may require a drive system to move various mechanical components like conveyors, pumps and the like. Such machinery through the use of such solvents, greases and oils being cleansed tends to broadcast, spray, or deposit slippery substances on the machine and over nearby surfaces. This may cause problems with mechanical linkages that may be used to drive various components by friction. Also, it may be advantageous to have a drive system that has a limited amount of slip built in so that if a device being driven jams that the device attempting to turn it does not burn out.

A common low cost drive mechanism with built in slip may be a drive belt and pulley system. However, in a slick environment the lubricating substances can foul the belt causing it to completely loose friction, and hence drive capability. A typical solution could be to use gears that engage each other directly. However, gears tend to be expensive to produce and require more precise alignment for proper engagement. Also, direct gears are unforgiving as there is no slip typically allowed between the driving gear and the gear being driven.

Another solution might be to use a drive chain and a toothed sprocket. However while low cost, no built in slip is allowed either.

It would be advantageous to have a parts washer with a drive system with limited slip that works in a slippery environment that contains fluids and other slippery substances, is inexpensive and has some built in slippage in the drive.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a parts washer which can be utilized as a parts washing sink and which can also be utilized as a jet wash having a drive system with limited slip by utilizing a minimum grip drive sprocket. A minimum grip drive sprocket having a knurled chain engagement surface rotably engages a drive chain typically in an environment exposed to a slick or lubricating medium allowing an acceptable degree of drive chain slip while maintaining rotation of the minimum grip drive socket.

Briefly, the present invention relates to a versatile parts washer which uses a water-based, biodegradable detergent solution for cleaning and degreasing mechanical parts such as automotive parts. The washer can be utilized both as a parts washing sink as well as a jet washer and is efficient to use and compact and economical to manufacture. The invention is a combination unit which provides the benefits of a sink washer and a jet washer in a single, compact, mobile unit requiring minimal shop floor space.

The washer has a sink, and a jet washer cabinet, which is preferably mobile, and is mounted on casters or wheels so it may easily be moved about in a shop. The cabinet may be any shape but is preferably square or rectangular and fabricated from steel suitably finished and insulated. The cabinet defines a sink, a reservoir, a mechanical enclosure and a jet washer compartment which contains electrical connections and other components. A heater may be provided for maintaining the washing solution at a suitable temperature for effective contaminant removal. Safety controls, such as a low water level heater shutoff sensor, is located within the housing.

In the Jet washer section a basket for receiving parts to be washed is located within the housing and mounted for rotation in suitable bearings. The basket is foraminous and is rotatably driven in the upper part of the cabinet either by a minimum grip drive sprocket having a knurled chain engagement surface that rotably engages a drive chain allowing an acceptable degree of drive chain slip while maintaining rotation of the minimum grip drive socket. The basket is disposed approximately 1" to 14" below the upper edge of the cabinet so that parts may be easily placed in the basket and removed once cleaned.

The pump has an inlet near the bottom of the housing which will deliver pressurized fluid to a manifold spray which directs pressurized fluid both vertically and horizontally for total coverage of the parts basket in the jet washer compartment.

The upper open end of the cabinet receives a parts sink which may be steel, stainless steel or other durable, chemical resistant material. The sink also serves as a lid or cover for the jet wash compartment in the cabinet. The sink is hinged to the cabinet so that it may be pivoted to the open position to access the interior of the cabinet. Preferably the sink is connected to the cabinet by a suitable mechanism such as a gas spring which will maintain the sink in the open position and dampen the return of the sink to the normal closed position overlying the cabinet.

The sink has a downwardly inclined bottom surface which directs fluid and contaminants to a central drain. The central drain discharges through a strainer. A baffle in the jet spray compartment deflects the jet spray so it does not discharge through the sink drain.

The present invention provides a versatile parts washer providing the combined features of both automatic and manual cleaning utilizing a water-based solution, or the like. In one mode of operation, the device is a portable parts washing sink. The cleaning solution is delivered to a brush via a hose and valve to regulate the flow. The parts washing sink can be utilized to clean smaller, less contaminated parts. The jet washer will normally be used to clean larger, more contaminated parts which makes the process more efficient. Small parts may also be washed and cleaned in the jet washer.

The parts can be automatically washed by pivoting the sink to the open position and placing the parts in the basket. The sink is closed to cover the cabinet compartment and the automatic cycle is initiated, causing cleaning solution to be sprayed from a manifold covering the parts in the cleaning basket.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
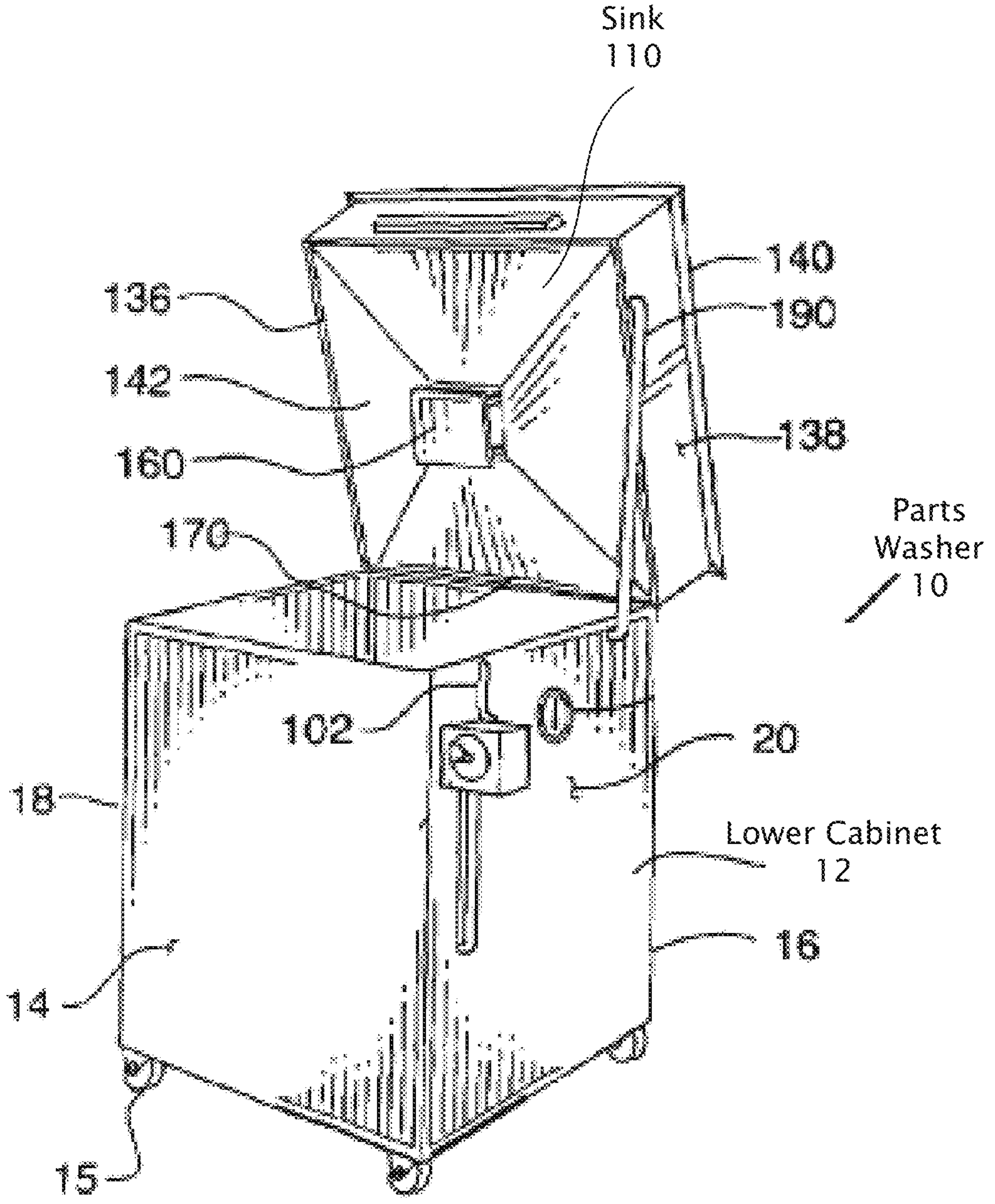
FIG. 1 is a perspective view of the parts cleaning apparatus of the present invention with a sink portion shown propped open.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a minimum grip sprocket drive system. Although the present examples are described and illustrated herein as being implemented in a parts cleaning system having a combined jet washer and a sink, the system described is provided as an example and not a limitation. As those skilled in the art will appreciate, the present examples are suitable for application in a variety of different types of parts washing systems in which the drive may be subjected to fouling by wet and/or slippery substances, such as separate sink washers, jet washers and the like.

The minimum grip drive sprocket is useful in applications where slippery substances are present that might foul, or cause complete loss of traction. The minimum grip drive sprocket may slip somewhat, but in general it continues to engage with a coupled drive chain-even when coated with slick and slippery substances. It is particularly useful as a cost effective drive system in low torque applications, and those where some slippage may be tolerated, as opposed to directly engaging gears, or a rubber belt that tend to foul and completely loose traction in a slippery environment.

One type of parts washer that may utilize a minimum grip sprocket is the sink-type washer which uses a recirculated solvent which dispenses a cleaning solution at a nozzle or brush. The user will simply scrub the part with the brush and the solvent will assist in removing contaminants. Sink-type parts washers, since they are manual, may be messy and time-consuming in use.

These devices may have a sink mounted on a housing which has a reservoir with an accessory such as a flow-through brush, spigot and drain strainer for catching parts. The parts are washed and the solvent flows through the drain into a fluid tank below the sink. A pump that may include a minimum grip sprocket may be used to advantageously move the solvent without jamming in a dirty environment.

Automatic jet washers are another type of parts washers. These type of devices have a cabinet in which is located a spray system connected to a pump for delivering pressurized cleaning solution. Such a pump may utilize a minimum grip sprocket as well to drive the pump as it tends to prevent excessive slippage and also prevent jamming of the pump in a dirty environment. A standard jet washer usually includes the cabinet, a basket or turntable on which the parts are to be cleaned and one or more spray manifolds.

Alternatively, a sink washer and a jet parts washer may be combined. In the example described below a combination jet washer and sink washer that utilizes a minimum grip sprocket drive system is described.

FIG. 1 is a perspective view of the parts cleaning apparatus of the present invention with a sink portion shown propped open. The present invention is a combination jet washer and sink washer that utilizes a minimum grip sprocket drive system.

Turning now to the drawings, the parts washer of the present invention is generally designated by the numeral 10 and includes a lower cabinet generally designated by the numeral 12. The lower cabinet is shown as being generally square or rectangular in horizontal cross-section having front wall 14, rear wall 16 and opposite sidewalls 18 and 20. It will be apparent that the cabinet may be other shapes such as round.

The rear wall of the sink is hinged to the rear wall of the cabinet by spaced-apart butt-welded hinges 170. The hinges allow the sink to be pivoted to the open position shown in FIG. 1 or returned to the closed position shown in FIG. 2. In the closed position, the lower edge of the sink rests on flange 172 extending around the interior of the cabinet below the upper edge.

Figure 2:
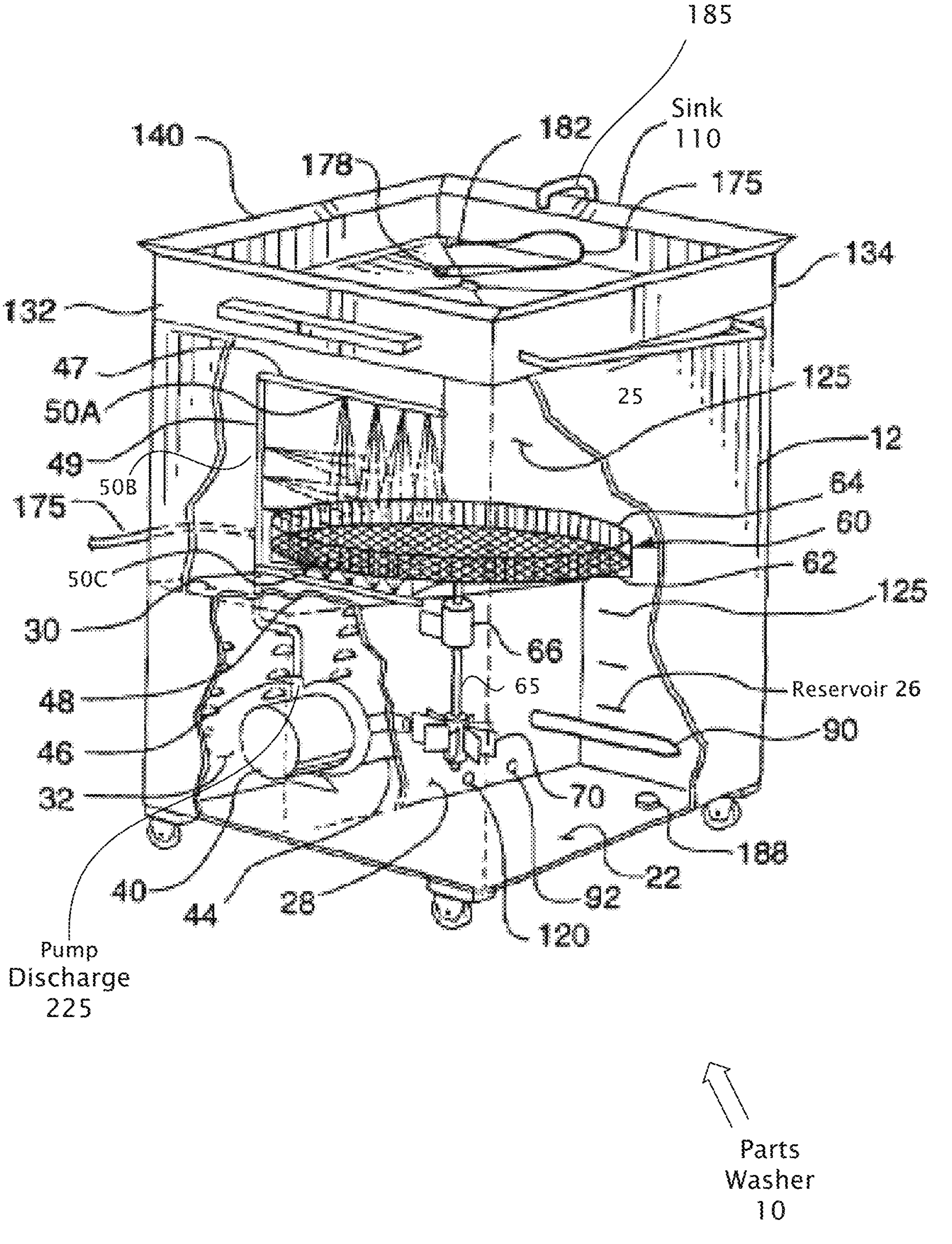
FIG. 2 is a perspective view of the parts cleaning apparatus of the present invention with the sink in a lowered position, and partly broken away to illustrate the details of the invention.

A suitable closer 190 extends between the sink sidewall 138 and the upper end and at sidewall 20 of the cabinet. Although only one closer is shown, two may be used. The closer serves to maintain the sink in the generally vertical, open position, as seen in FIG. 1, so that the mechanic may access the interior in order to place parts on the cleaning basket or remove them. The closer also will damper closing of the sink so that it slowly descends to the closed position as shown in FIG. 2 overlying the reservoir. The closer will also maintain the sink in a safe, open position when the washer is rolled from one location to another on the casters 15. The closer preferably is a gas spring damper for controlling the lowering of the sink at a controlled, constant speed such as manufactured by Suspa.

FIG. 2 is a perspective view of the parts cleaning apparatus of the present invention with the sink in a lowered position, and partly broken away to illustrate the details of the invention.

The cabinet has a floor 22 and defines a chamber having jet cleaning chamber 25 in its upper end and a fluid reservoir 26 in its lower end. A vertical panel 28 extends between the front wall (14 of FIG. 1) and rear wall (16 of FIG. 1). The upper edges of the panel connect to a horizontal panel 30 which defines a mechanical enclosure 32 which is accessible through a vented access door (not shown) in the sidewall (18 of FIG. 1). The enclosure 32 may be located at any convenient location in the cabinet.

The cabinet 12 may be fabricated from a suitable material such as a 12 gauge, rolled steel which is preferably insulated having a laminated insulative covering. A layer of fiberglass over the steel with a covering a sheet metal stitch-welded to the cabinets is a suitable material for this purpose. The cabinet may be mounted on casters 15 for mobility.

As best seen in FIG. 2, a pump 40 such as a pump of the type manufactured by Teel is mounted within the mechanical enclosure 32. The pump 40, typically ¾ to 1½ hp, has an inlet which communicates with the lower reservoir 26 via a conduit 44 in an opening in the vertical baffle 28. The pump discharge 225 is connected to conduit 46 which extends vertically through the horizontal panel 30 along the sidewall (18 of FIG. 1).

The conduit communicates with a spray manifold 47, 48, 49 50A, 50B, 50C having upper horizontal section 47, lower horizontal section 48 and vertical section 49. The horizontal sections 47, 48 extend at least half way across the interior of the cabinet. A plurality of orifices 50B are positioned at spaced-apart locations in the vertical manifold section 49. Similarly, a plurality of spaced-apart orifices 50A and 50C are disposed in the horizontal sections 47, 48 of the spray manifold 47, 48, 49 and are disposed to deliver a jet spray upwardly, downwardly and horizontally. The combination of the vertically disposed spray and the horizontal disposed spray patterns will provide a substantially full coverage to insure adequate cleaning of the parts on the parts basket 60 as it rotates with contained parts.

The parts basket 60 is shown as being generally circular with a bottom 62 and a peripheral sidewall 64 of steel mesh or equivalent. Typically, the diameter of the basket is approximately 18" to 24." A shaft 65 extends downwardly from the center of the bottom 62 of the basket 60 and is mounted in journal bearing 66 for rotation.

Rotation to the basket 60 in this first example of a basket rotation mechanism may be imparted by fluid flowing from the reservoir 26 into the pump inlet conduit 44. The conduit 44 is in close proximity to a plurality of vanes 70 arranged peripherally around the lower end of the shaft 65. The fluid flow passing the vanes 70 induced by the suction of the pump will cause the shaft 65 and basket 60 to rotate. However while allowing slippage in the drive system since a fluid flow is used to turn the shaft by fluid pressure on the vanes, this arrangement typically does not produce as much rotational torque to turn the basket as one that has direct contact with the shaft 65. However if the basket jams causing rotation to cease, the motor is not overtaxed since there is no direct connection between the motor in the pump and the shaft.

Figure 5:
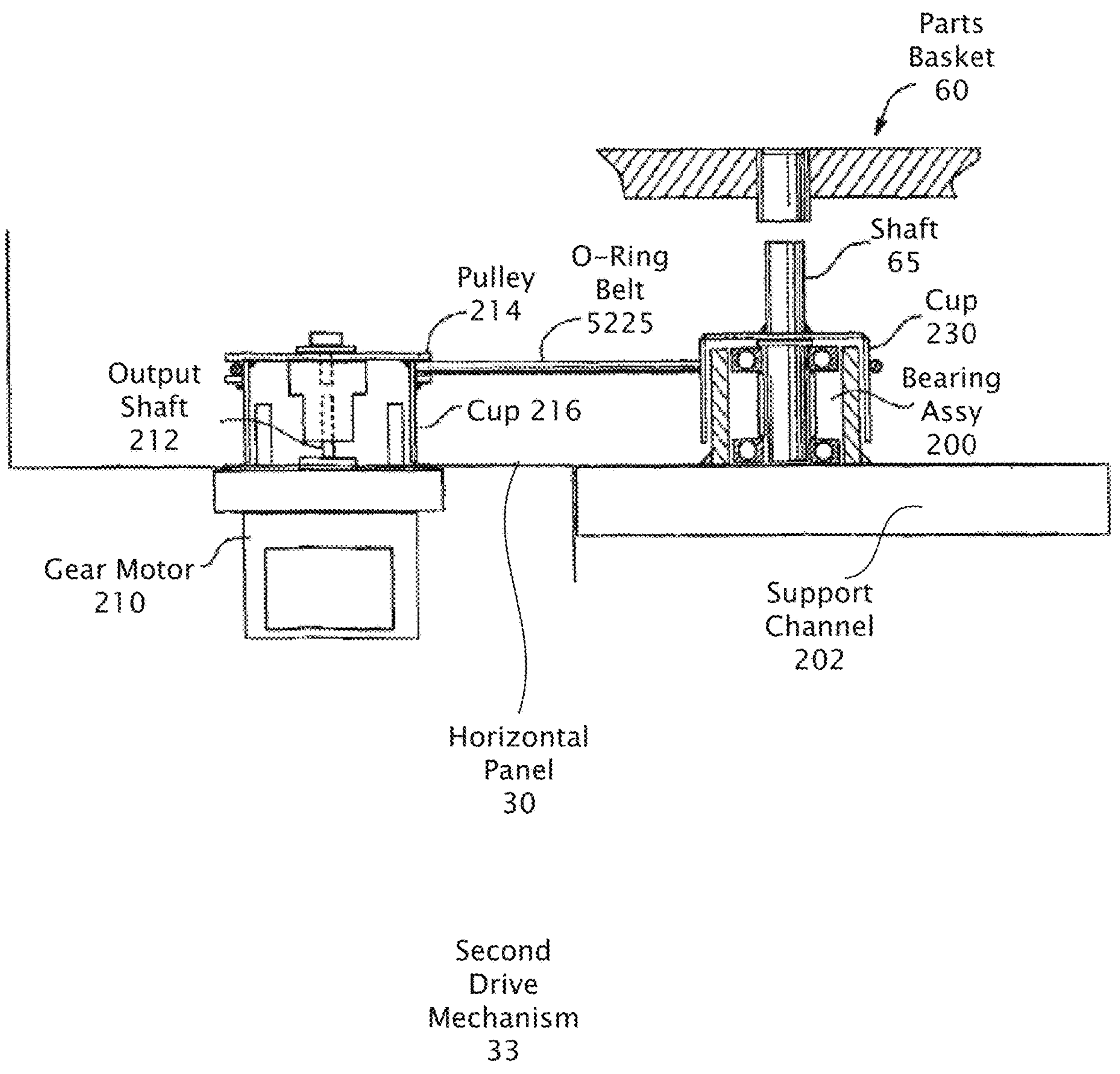
FIG. 5 is detail view illustrating a second alternate drive assembly for the parts basket viewed from the side.

In a second example (Shown in FIG. 5) of a basket rotation mechanism 33 basket rotation may be achieved by a conventional gear motor (210 of FIG. 5) with a pulley (214 of FIG. 5) driving a cup (230 of FIG. 5), via a rubber O-ring belt (5225 of FIG. 5). The drive mechanism (33 of FIG. 5) may be mounted utilizing brackets, with methods known to those skilled in the art to the cabinet 12. Although this method of turning the basket may be an improvement over that shown in the first example of the invention, the rubber O-ring belt may tend to lose traction and excessively slip.

Figure 9:
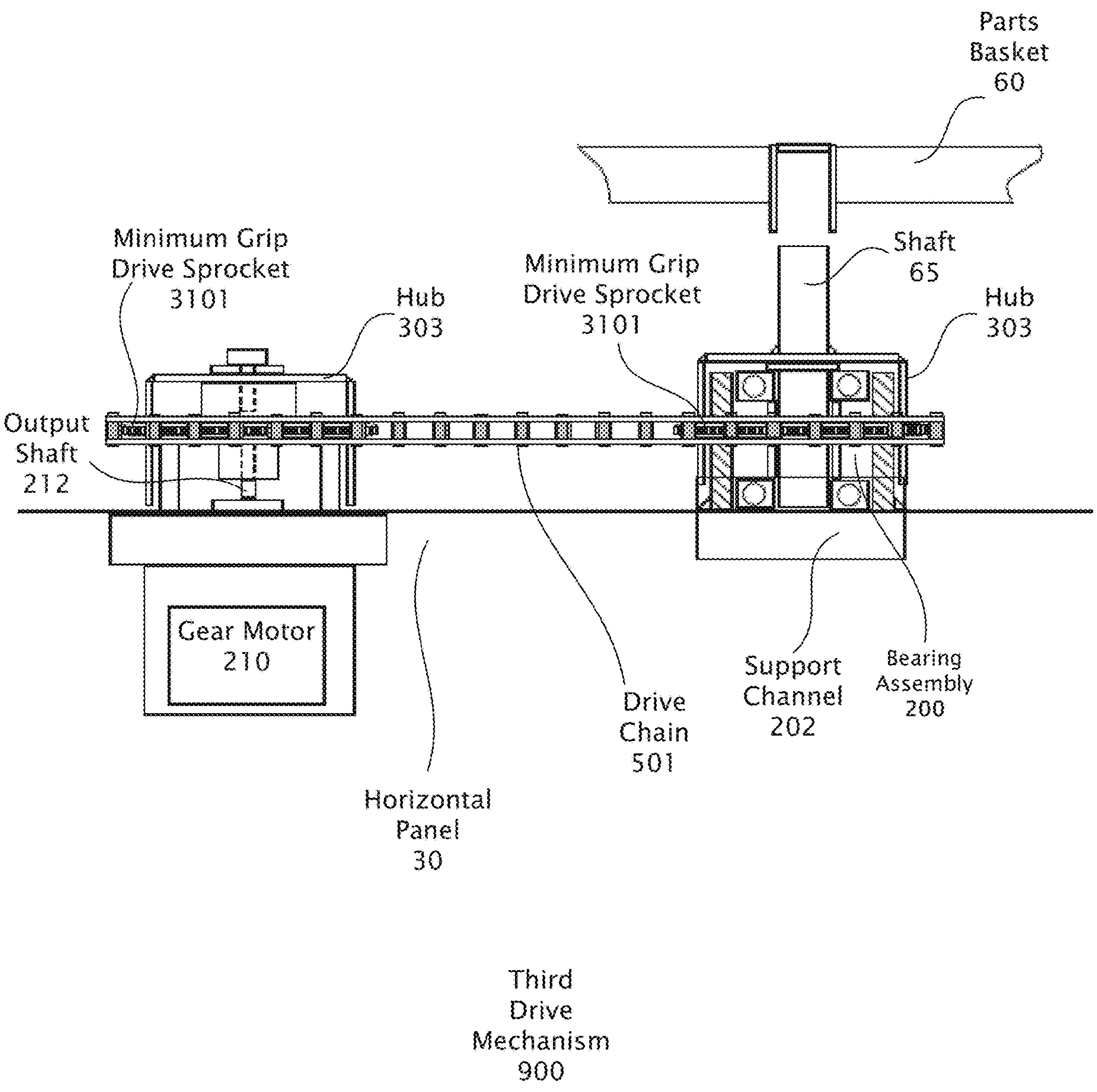
FIG. 9 is detail view illustrating a third alternate drive assembly utilizing a minimum grip drive sprocket drive for the parts basket viewed from the side.

In a third example (Shown in FIGS. 9-10) of a basket rotation mechanism 900 basket rotation may be achieved by a conventional gear motor (210 of FIG. 9) driving at least one minimum grip drive sprocket (3101 of FIG. 9) via a linked drive chain (501 of FIG. 9). The drive mechanism (900 of FIG. 9) may be mounted utilizing brackets, with methods known to those skilled in the art to the cabinet 12. The linked drive chain (similar to a bicycle chain) turning and/or being turned by minimum grip drive sprockets tends to provide the advantages in strength of drive of the second example's belt drive and the jam resistance of the fluid over the vanes of the first example.

The third example of drive mechanism 900 is particularly well suited to oily and dirty environments. In the parts cleaner not only are slippery solvents present, but dirt and greasy substances from the cleaning process tend to be washed into the cleaning solution. This dirt and grease can also become deposited on the internal mechanisms of the washer interfering with the operation. In particular the dirt can build up between drive belts or chains and wheels and sprockets. This can cause slippage and even cause the belt to "jump off" of its sprocket or pulley. The third example of drive mechanism 900 is particularly immune to dirt build up over most other drive mechanisms. Around the outer edge of the minimum grip drive sprocket 3101, is a knurled (3103 of FIG. 12) or dimpled (1002 of FIG. 19) pattern that tends to push away the dirt and solvent that would otherwise tend to foul the drive.

In a fourth example (not shown) of a basket rotation mechanism basket rotation may be achieved by direct drive. A conventional gear motor with an internal clutch may be configured to drive the shaft 65. However the addition of a clutch tends to increase the cost of manufacture.

In use, the reservoir in the cabinet contains a suitable cleaning solution such as a water-based, non-flammable, biodegradable detergent as manufactured by Golden West and sold under the trademark Insta-Clean MB5. The effectiveness of the cleaning solution is enhanced by heating a solution to a suitable temperature, as for example 150. degree. F. Heating is accomplished by a heating element 90 which is shown as an electric resistance heating element (or equivalent) that extends into the reservoir 26 at a location above the floor of the cabinet. A thermostat 92 may be attached to wall 32 and the opening around the thermostat may be sealed. The thermostat may be connected to a source of electricity and controls the temperature of fluid within the reservoir.

In the sink 110 parts cleaning or washing fluid is directed to the sink through a flexible hose 175 which, at its distal end, terminates at a handle and brush assembly 178. The hose 175 is connected at a proximal end to the manifold 47, 48, 49 50A, 50B, 50C so that pump 40 provides a flow of pressurized cleaning solution to the brush. The brush may be metal or a synthetic material. In use, the mechanic may direct a regulated flow of cleaning solution through the brush by manual adjustment of flow control valve 182.

Items to be cleaned may be placed in the sink 110 or held over the sink and manually cleaned by brushing the parts using the brush. The flow of cleaning solution through the brush will assist in removing contaminants and will serve to flush the contaminants from the sink into the center drain (145 of FIG. 4A). Small parts that are inadvertently dropped in the sink will be caught in the drain screen (148 of FIG. 4A). Fluid and removed contaminants will flow through the drain to be collected in the reservoir.

The rear of the sink may also be provided with a fixed nozzle 185 which may be operated to direct a stream of washing fluid on to the part or the item to be cleaned. The stream will flush away contaminants and allows hands-free operation as the part can be placed in the sink with cleaning fluid directed on to the parts. The reservoir 26 may be periodically drained and flushed at drain plug 188.

As indicated, the reservoir 26 contains a suitable cleaning solution such as a water-based, non-flammable, biodegradable detergent solution. The effectiveness of the solution may be enhanced by heating the solution. The pump 225, when actuated, withdraws fluid from the reservoir 26 and discharges it through the spray nozzles or through the manual brush or both.

As mentioned above, a unique aspect of the present invention resides in the versatility of the device in that it can be used as an automatic jet washer, as well as a parts washer. When used as a jet washer, the sink will be pivoted to the open position as shown in FIG. 1 and parts to be cleaned can be placed on the parts basket 60. Once the sink is returned to the closed position, the safety interlock (102 of FIG. 1 and FIG. 5) will allow the user to actuate the pump causing fluid to be delivered to the manifold system and also causing the fluid to impart rotation to the basket (or in the alternative examples of basket rotation mechanisms to activate a gear motor). Generally, the jet washing cycle will be set for a predetermined period of operation controlled by the timer (60110 of FIG. 5), as for example 10 minutes. When the cleaning cycle is completed, the sink 110 can be lifted to the open position to provide access to the interior chamber and the parts can be removed.

Fluid is delivered through hose 175 to the brush 178 from the manifold 47, 48, 49 50A, 50B, 50C. Fluid and removed contaminants are removed from the sink by hand washing and will be discharged from the sink into the cabinet reservoir. It is not necessary for the user to place the parts to a separate sink such as the side-by-side sink of a conventional part washer. The design of the parts washer of the present invention is extremely versatile, compact and economical. The user is not required to buy three separate units as is often the case with conventional washers.

Further, the device is portable as the casters 15 allow the device to be easily transported to the area where the mechanic is working, as for example as is the case when a vehicle is on a lift and the mechanic is replacing brake parts and the brake components require cleaning. In this case, the sink can be positioned below the brake assembly. The brush can be applied to the brake parts on the vehicle and the fluid and contaminants collected in the sink and will flow into the sink and will flow into the cabinet.

Figure 3:
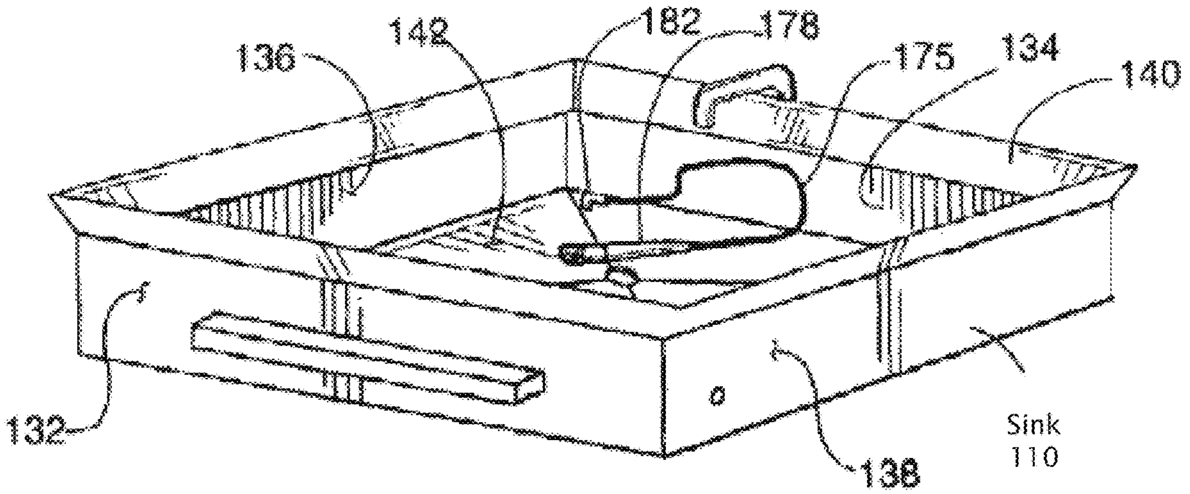
FIG. 3 is perspective view of the sink portion of the parts cleaning apparatus.

FIG. 3 is perspective view of the sink portion of the parts cleaning apparatus. The sink 110 is a parts washing sink and also serves as the lid or cover for the jet spray chamber within the cabinet. The sink has a front wall 132, rear wall 134 and opposite sidewalls 136, 138. The walls are dimensioned so that the lower edge of the sidewalls extend into the cabinet to fully enclose the chamber when in a closed position. The sink sidewalls have a continuous circumferentially extending flange or lip 140 which extends outwardly and upwardly at about 25. degrees From the horizontal to assist in containing fluid within the sink.

Figure 4:
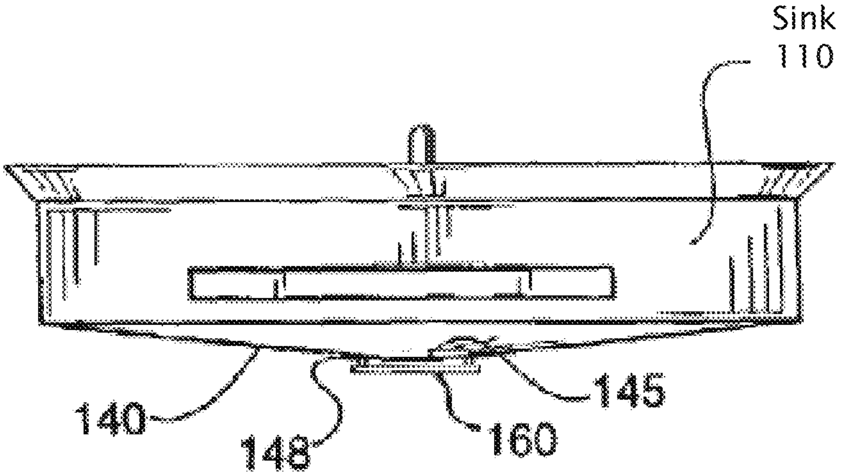
FIG. 4 is a front view of the sink portion of the parts cleaner.

FIG. 4 is a front view of the sink portion of the parts cleaner. A circumferentially extending flange or lip 140 surrounds a center drain 145. The drain 145 includes a horizontal baffle 160 disposed there below. The center drain also includes a drain screen 148.

Figure 4A:
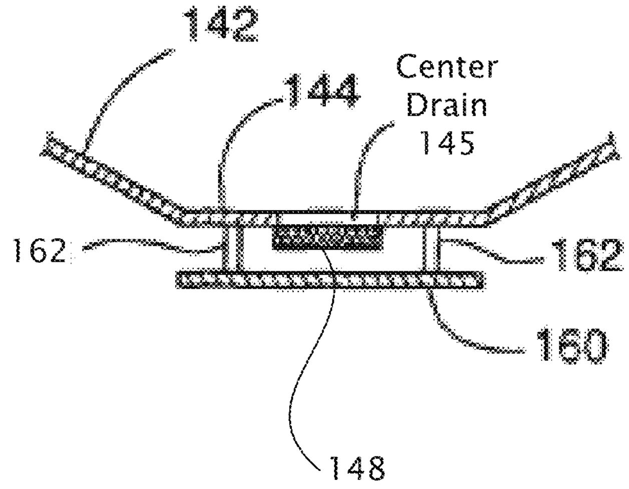
FIG. 4A is a cross-sectional detail of the sink drain.

FIG. 4A is a cross-sectional detail of the sink drain. The sink has a floor 142 and is inclined downwardly to a central section 144. The central section 144 defines a drain opening 145 which has a drain screen 148 to prevent small parts from falling through the drain. A horizontal baffle 160 is disposed below the drain suspended on vertically extending hangers 162 from the underside of the sink floor to deflect spray within the interior of the cabinet to prevent it from exiting the drain 145.

FIG. 5 illustrates the second alternate drive mechanism 33 for the rotatable parts basket 60. In this case, basket 60 is supported on a bearing assembly 200 located on a support channel 202 extending from wall 28 of the enclosure 32. A gear motor 210, such as a fractional horse power gear motor is mounted within the mechanical enclosure having an output shaft 212 extending vertically through panel 30. The opening in the panel is suitably sealed. A pulley 214 is attached to the output shaft and may include a downwardly depending cup 216 to protect the shaft. An O-ring belt 5225 extends from the pulley 214 to a hub shaped like a cylindrical cup 230 secured to the lower end of the basket support shaft 65. The relative diameters of the gear motor spindle and the basket support pulley can be selected to provide the appropriate rotational speed for the basket. Typically, rotational speeds will be from approximately from 1 to 10 rpm. The O-ring belt is twisted into a figure eight configuration to increase retention so it will not slip on the exterior of the cup 230. Actuation of the gear motor 210 will drive the basket through the O-ring belt and pulley system.

Figure 6:
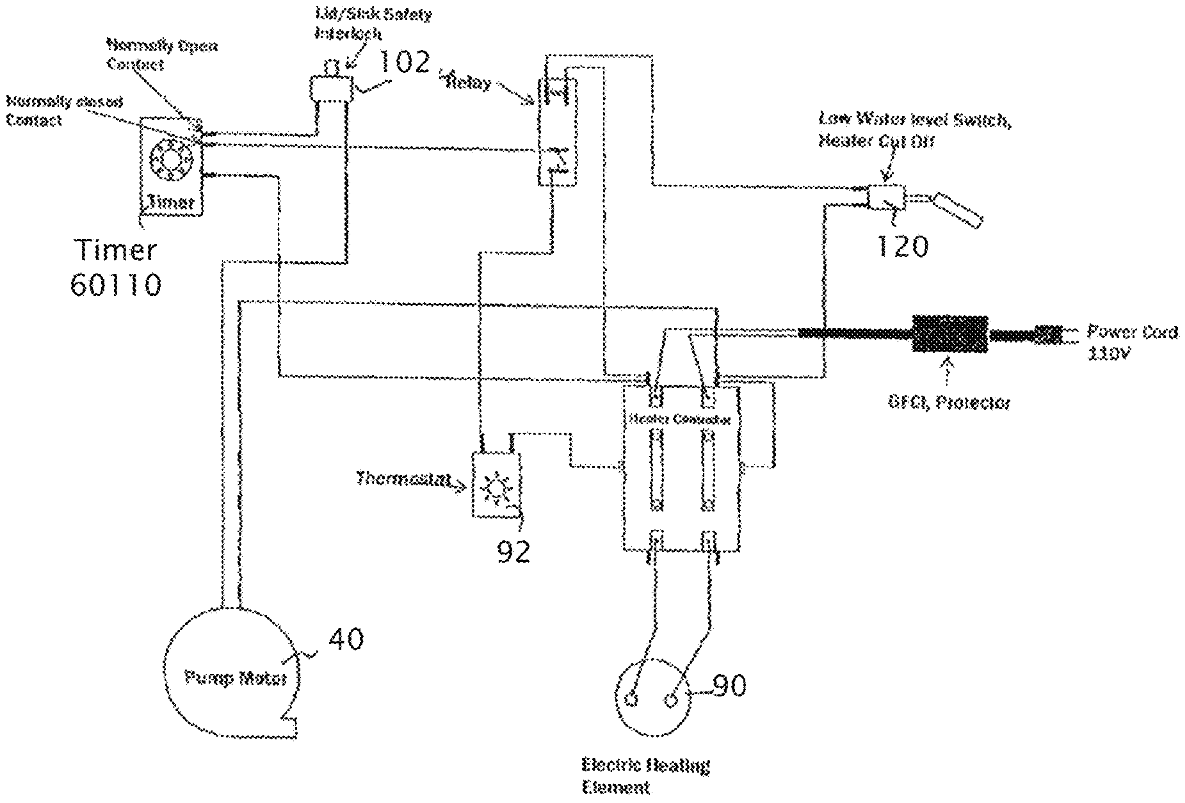
FIG. 6 is a schematic of the electrical system.

FIG. 6 is a schematic of the electrical components. The pump is connected to a source of power such as 110 VAC across a ground fault interrupter. The pump is operable by means of a timer 60110 having a safety interlock 102 which is moved to an operative position only when the sink is in a closed position. The timer 60110 will energize the pump motor 40 for a predetermined period of time with 10 minutes being typical for most cleaning operations. The pump will withdraw heated washing fluid from the fluid reservoir 26 and direct it through the conduit 46 to the manifold 50 which discharges spray against the washing basket 60. When the timer 60110 times out, the pump motor 40 will cease operation and can be restarted by restarting the timer. The thermostat is set at a suitable temperature as for example 150. degree. F. A low fluid level sensor 120 will shut off the pump and heater if the fluid level drops below a minimum level. The fluid level may be visually checked by reference to the level indicator markings 125 on an interior wall of the cabinet. Safety switch 102 is located on the side of the cabinet and will permit operation of the spray system only when the sink 110 is in the closed position shown in FIG. 2.

Figure 7:
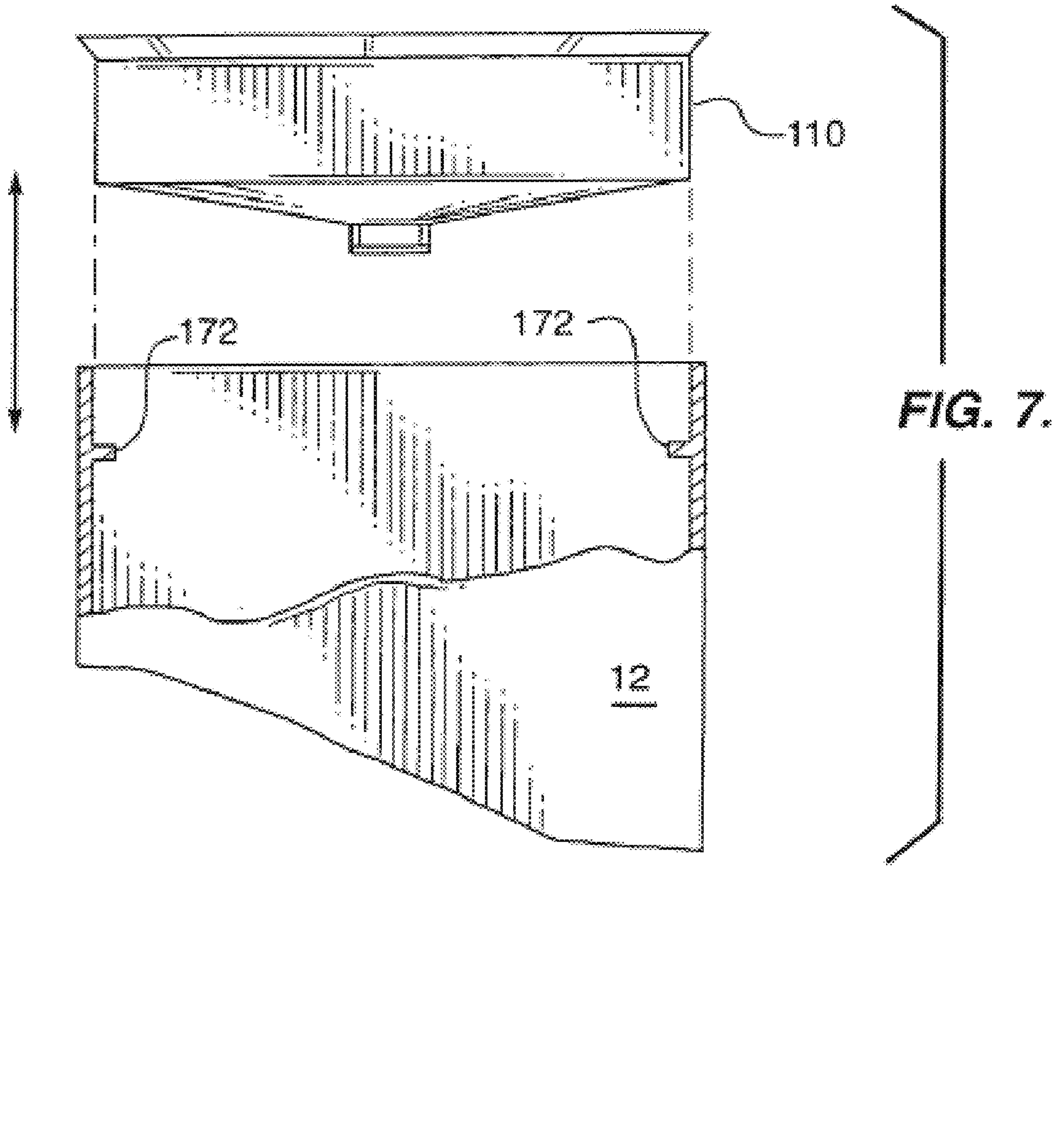
FIG. 7 is a front view of another example of the sink and cabinet.

FIG. 7 shows another example of the invention in which the sink 110 rests on flange 172 in the closed position. The sink 110 is a lift-off sink which may be removed to access the interior of the cabinet 12 or may be placed on the flange 172 to enclose or cover the jet washing chamber.

In FIG. 8, the sink 110 again has a closed position over the top of the cabinet. The sink 110 has rollers 8210 which rest on guide rails 200 and may be slid rearwardly to an open position or moved forwardly to a closed position. Side panels 204 extend rearwardly to enclose the sink when in the forward position to prevent spray from exiting the cabinet. Stops 215 and 220 limit the travel of the sink.

FIG. 9 is detail view illustrating a third alternate drive assembly 900 utilizing a minimum grip drive sprocket drive for the parts basket viewed from the side. In this case, basket 60 is supported on a bearing assembly 200 located on a support channel 202 extending from wall (28 of FIG. 1) of the enclosure (32 of FIG. 1). A gear motor 210, such as a fractional horse power gear motor is mounted within the mechanical enclosure having an output shaft 212 extending vertically through panel (30 of FIG. 1). The opening in the panel is suitably sealed. A minimum grip drive sprocket 3101 may be attached to the output shaft and may include a downwardly depending cup or hub 303 to protect the shaft and provide attachment for the minimum grip sprocket. A drive chain 501 extends from the sprocket 3101 to a second minimum grip drive sprocket 3101 attached to a second hub shaped like a cylindrical cup 303 secured to the lower end of the basket support shaft 65. The relative diameters of the two minimum grip drive sprockets can be selected to provide the appropriate rotational speed for the basket. Typically, rotational speeds will be from approximately from 1 to 10 rpm. Actuation of the gear motor 210 will drive the shaft 65 through the drive chain 501 and two minimum grip drive sprocket system. In a further alternative example a conventional sprocket and a single minimum grip drive sprocket may be used.

Figure 10:
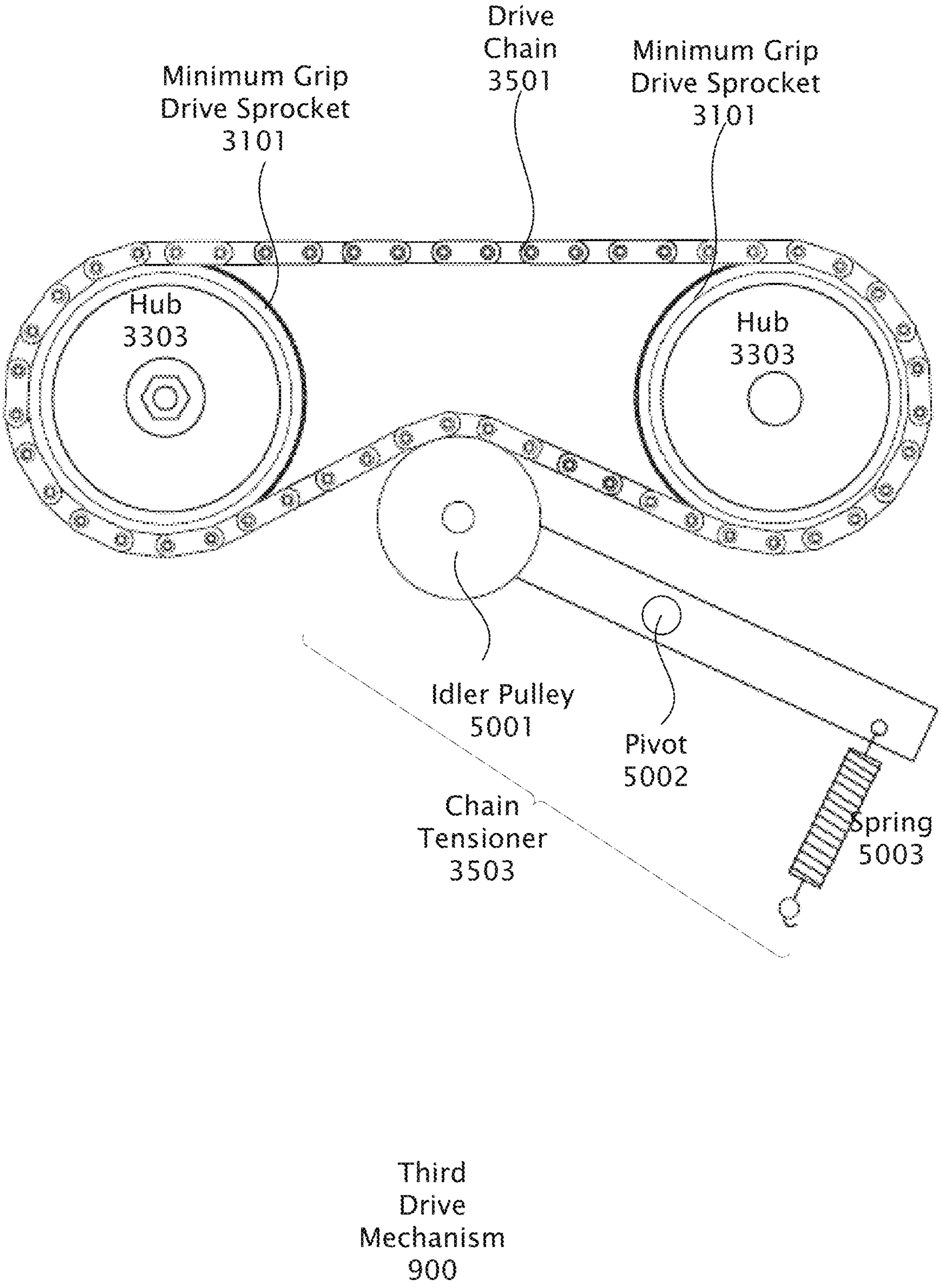
FIG. 10 is detail view illustrating a third alternate drive assembly utilizing a minimum grip drive sprocket drive for the parts basket viewed from the top.

FIG. 10 is detail view illustrating a third alternate drive assembly utilizing a minimum grip drive sprocket drive for the parts basket viewed from the top. The attachment of each minimum grip drive sprocket 3101 to their respective hubs 3303 is shown from the top. Also shown is a chain tensioner 3503 that includes an idler pulley 5001 contacting the chain, and pressing against the chain 3501. To maintain pressure against the chain 3501 spring bias provided by a spring 5003 or equivalent may be utilized, acting through an elongate member rotating about a pivot 5002.

Figures 11, 12:
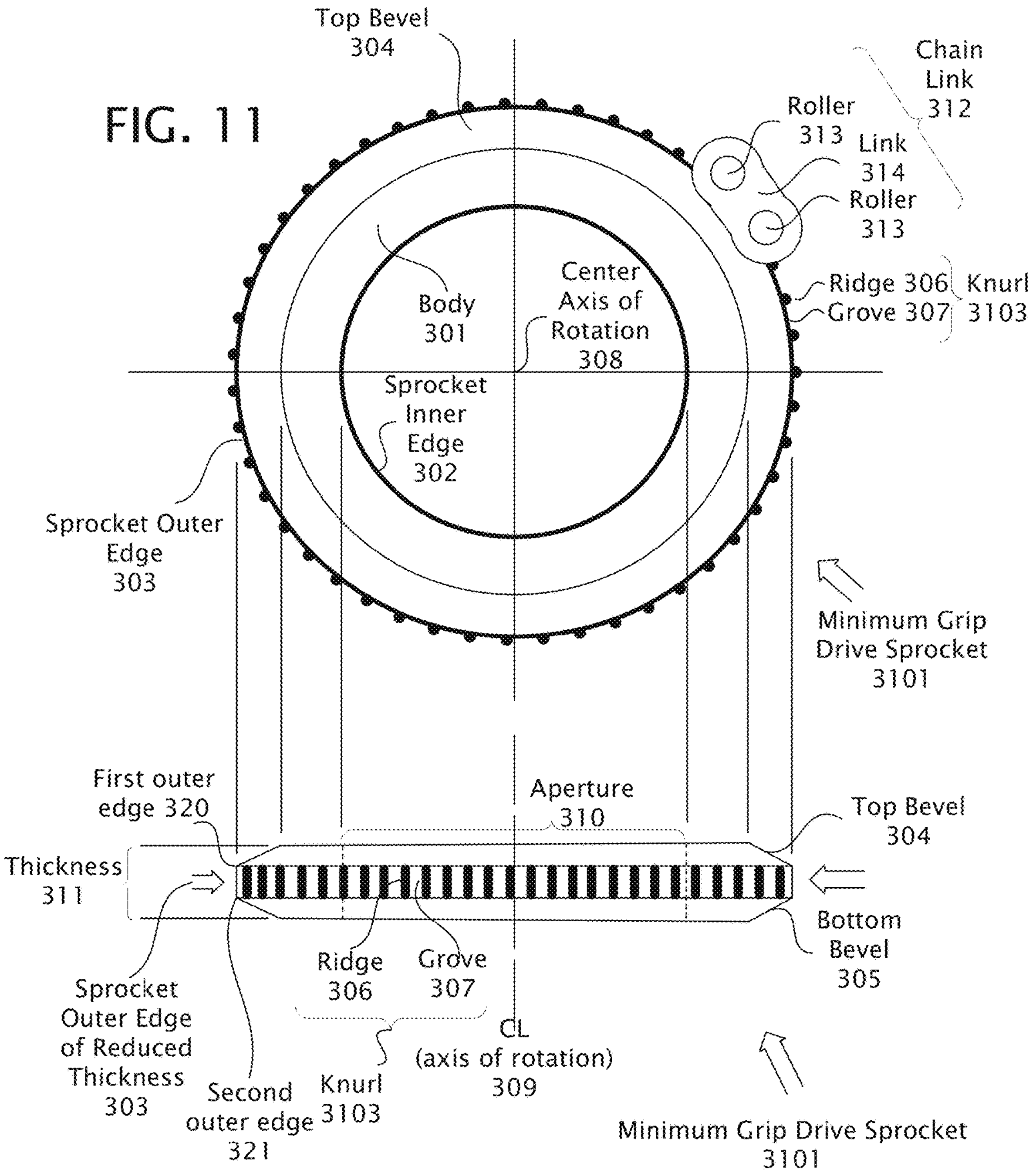
FIG. 11 is a top view of a minimum grip drive sprocket engaged with a chain link and having exaggerated features for descriptive purposes.
FIG. 12 is a side view of a minimum grip drive sprocket and having exaggerated features for descriptive purposes.

FIG. 11 is a top view of a minimum grip drive sprocket (or as used herein "sprocket") 3101 engaged with a chain link 312 and having exaggerated features for descriptive purposes. The minimum grip drive sprocket body 301 is generally round and ring shaped, with a knurled minimum grip drive sprocket outer edge 303, and a minimum grip drive sprocket inner edge 302 as shown. The body may also include a top bevel 4 adjacent to the minimum grip drive sprocket outer edge 303. The minimum grip drive sprocket 3101 turns about a center axis of rotation 308.

The minimum grip drive sprocket outer edge 303 may include a knurled 3103 pattern that can include various patterns of ridges 306 and groves 307. The knurling 3103 may be provided to aid in engaging the rollers 313 of a chain to turn the chain. One chain link 312 of an exemplary drive chain is shown in engagement with the minimum grip drive sprocket 3101. The chain link shown is a conventional drive chain including links 314 for retaining rollers 313, and coupling to adjacent links (not shown) that make up the drive chain. The minimum grip drive sprocket 3101 may also include a bevel 304 that thins the body 301 material so that the rollers 313 of the chain may contact the knurled 3103 outer edge 303.

The exemplary minimum grip drive sprocket 3101 may be constructed from ferrous metal, although in equivalent examples, aluminum, brass, plastic, nylon or the like may be used.

FIG. 12 is a side view of a minimum grip drive sprocket 3101 and having exaggerated features for descriptive purposes. The minimum grip drive sprocket 3101 includes a circular aperture 310, centered about a centerline, or axis of rotation 309. The edge of the minimum grip drive sprocket 3101 may be beveled on one, or both sides 304, 305. The bevels 430, 305 are formed so that the edge 303 of the minimum grip drive sprocket fits between the links of a conventional metal, or the like, drive chain (314 of FIG. 1). The thickness of the minimum grip drive sprocket at the beveled edge must not be so thick as to prevent the knurled outer edge from contacting, and subsequently driving, rollers (3113 of FIG. 1) of a drive chain (312 of FIG. 1).

Adjacent to the outer edge 303 of the minimum grip drive sprocket there are typically a bevels 304, 305, reducing the thickness 311 of the minimum grip drive sprocket 3101. A reduction in thickness may be desired to provide clearance of the space between the links of an engaged drive chain (not shown) so that the knurled 3103 outer edge may engage the chain roller links (not shown). Various types of reductions in thickness may be provided. Here a linear reduction from overall thickness 311 to minimum grip drive sprocket outer edge thickness 303 is a linear taper. However in equivalent examples reductions of thickness may be made by one or more steps or the like.

The ring shape facilitates coupling to a hub (of FIG. 7) inserted through the aperture 310. However, in alternative examples (not shown) the minimum grip drive sprocket 3101 may be disk shaped rather than ring shaped, or equivalent, to attach to a shaft passing through the center of the minimum grip drive sprocket rather than a hub.

The surface of the outer minimum grip drive sprocket edge 303 is typically parallel to an axis of rotation 309 of an installed minimum grip drive sprocket 3101.

The knurl 3103 may be in a pattern of parallel lines as shown, or other equivalent pattern (cross hatched, dimpled or the like) disposed around the outer edge of the minimum grip drive sprocket 3101. Alternatively other irregular or rough surfaces may be utilized that are sufficient to contact the rollers of a drive chain, to the extent needed to turn the minimum grip drive sprocket 3101, while allowing some slippage. The knurl 3103 in the example shown is a series of parallel groves 307 and ridges. In practice the knurled pattern may be considerably finer than as shown here.

FIGS. 11-12 show the minimum grip drive sprocket 3101 from the top and side. The sprocket has a body 301 formed from a flat work piece (typically metal, or the like) of uniform thickness 311. It has a top side and a bottom side of defined thickness 311. It is circular with an outer sprocket edge 303, and a concentric aperture 310 disposed therein. The sprocket 3101 is beveled on the top 304 and bottom 305 around the outer edge 303 to reduce its thickness on the outer edge. The sprocket 3101 includes a top bevel 304 around the top outer edge, and a matching bottom bevel 305 around the bottom edge. The bevels 304, 305 reduce the thickness of sprocket body 301 to that of a sprocket outer edge 303.

The sprocket outer edge 303 may be knurled or textured. The top and bottom bevels are calculated to reduce the sprocket thickness so that parallel chain links clear the sprocket in the beveled area and allow the sprocket outer edge to engage rollers of the chain with its knurled outer edge.

Figure 13:
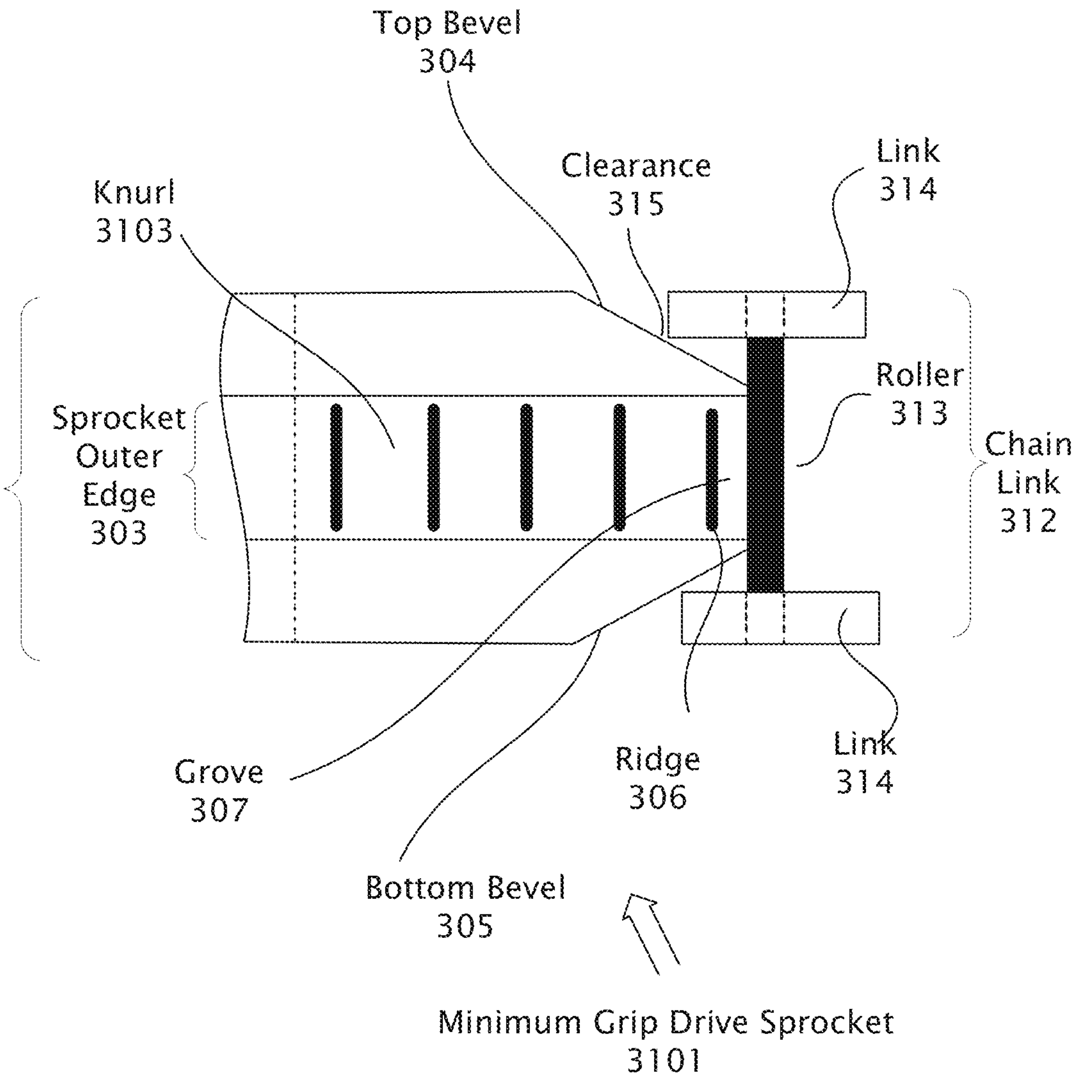
FIG. 13 is a side view of a minimum grip drive sprocket engaged with a chain link and having exaggerated features for descriptive purposes.

FIG. 13 is a magnified side view of a minimum grip drive sprocket 3101 engaged with a chain link 312 and having exaggerated features for descriptive purposes. The thickness 311 of the minimum grip drive sprocket 3101 may be made thin enough so that no bevel is needed to clear the chain links 314. Or in the case of thicker minimum grip drive sprockets 3101 the edge 303 may be beveled on the top 304, and or bottom 305 so that the minimum grip drive sprocket outer edge 303, with knurled 3103 groves 307 and ridges 306, may extend to and contact the rollers 313.

The knurls tend to provide traction against the rollers 313 in a slippery environment. Also, if something happens to prevent the chain from turning the minimum grip drive sprocket may continue to turn by slipping over the knurled 3103 surface of the minimum grip drive sprocket 3101. The knurls also aid in pushing oil and grease from between the chain links and the sprocket so that contact may be maintained between the sprocket and chain surfaces.

If not beveled 304, 305 around the outer edge 303 the links 314 may contact the minimum grip drive sprocket 3101 body first preventing the knurled surface 3103 from reaching and contacting the rollers 313. When sized so that the rollers 313 contact the outer edge 303 the bevel is angled so that the links 314 contact the minimum grip drive sprocket 3101, or are sized so that there is clearance 315 between the minimum grip drive sprocket 3101 and links 314. The bevels 304, 305 also tend to help center the chain 312 on the minimum grip drive sprocket 3101.

Figure 14:
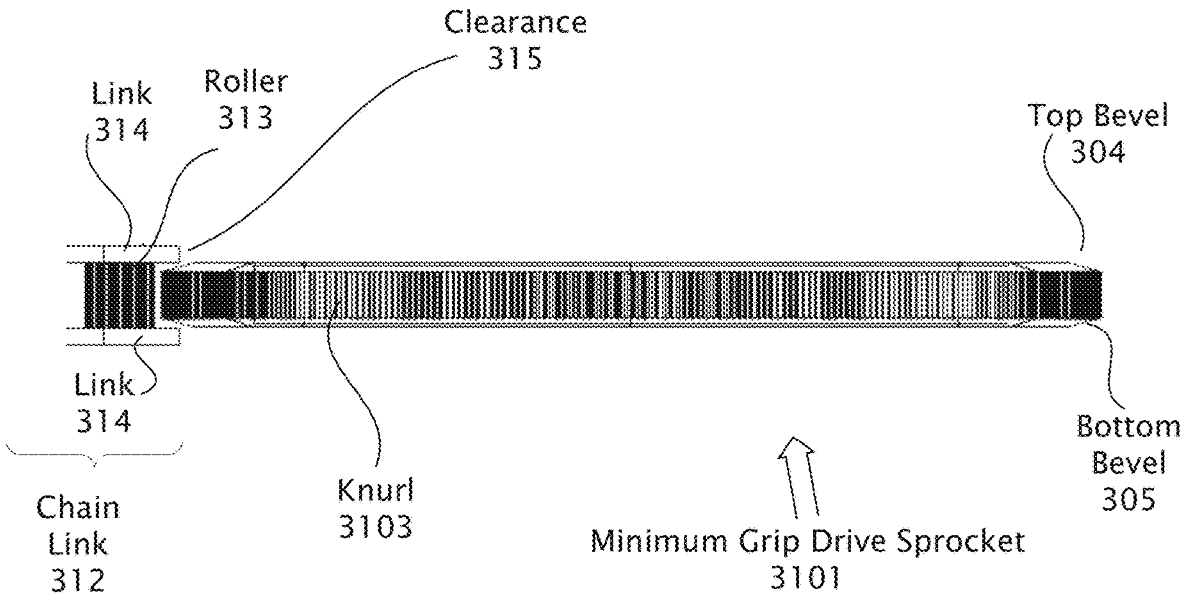
FIG. 14 is a side view of a first example of a minimum grip drive sprocket engaged with a chain link.

FIG. 14 is a side view of a first example of a minimum grip drive sprocket 3101 engaged with a chain link 312. This drawing is of truer proportion to a fabricated minimum grip drive sprocket 3101. The knurling 3103 contacting the roller 313 is quite fine. Top and bottom bevels 304, 305 provide a clearance 315 on both sides of the minimum grip drive sprocket 3101 so that links 314 do not interfere with the knurl 3103 contacting the chain rollers 313.

Figure 15:
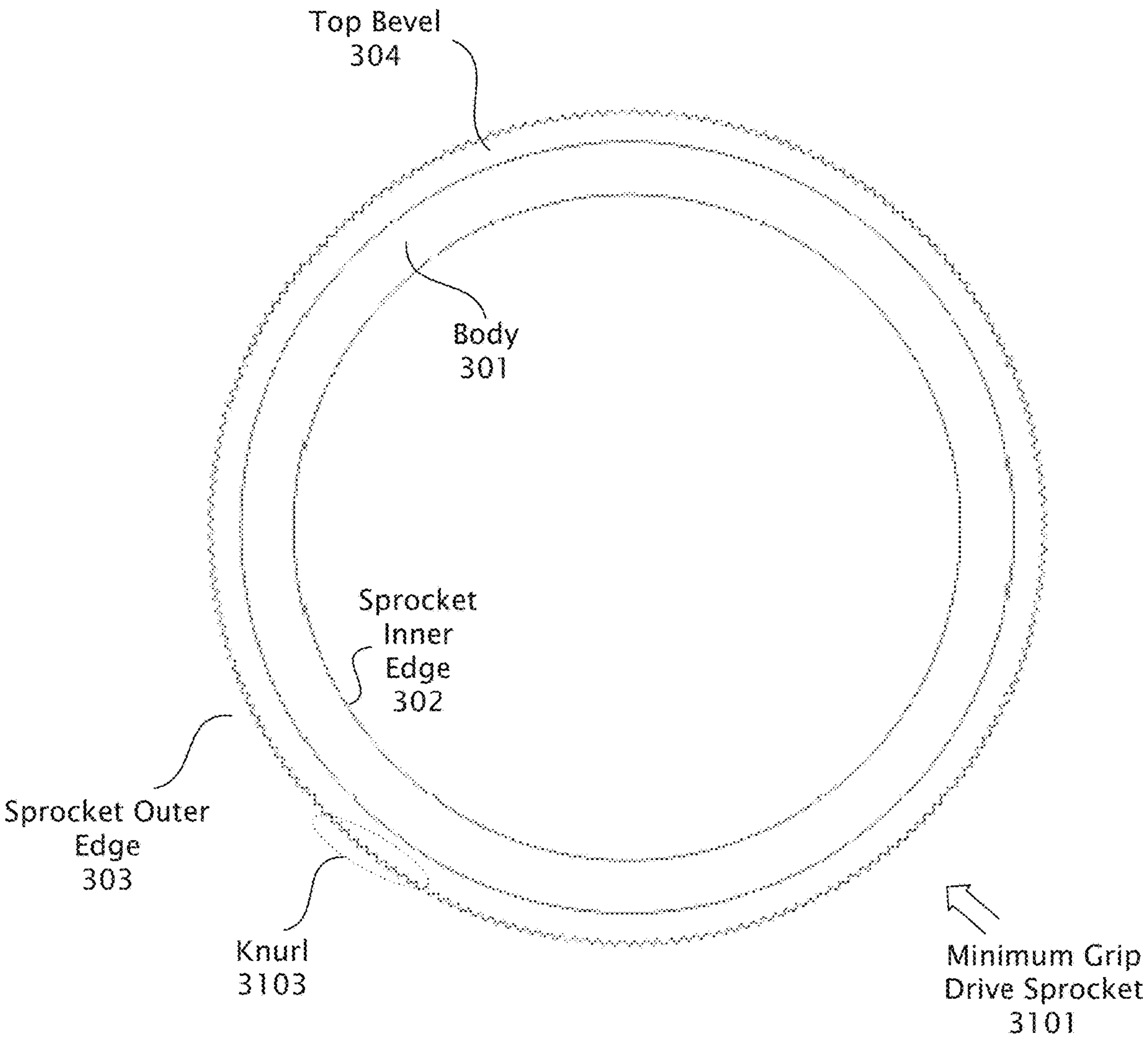
FIG. 15 is a top view of the first example of the minimum grip drive sprocket.

FIG. 15 is a top view of the first example of the minimum grip drive sprocket 3101. In this example the top bevel extends over about a third of the width of the ring body 301. The thickness of the minimum grip drive sprocket between the minimum grip drive sprocket outer 303 and inner edge 302 is somewhat narrow as this exemplary minimum grip drive sprocket is made to fit over a hub (not shown). The outer edge 303 includes a knurled pattern 3103.

Figure 16:
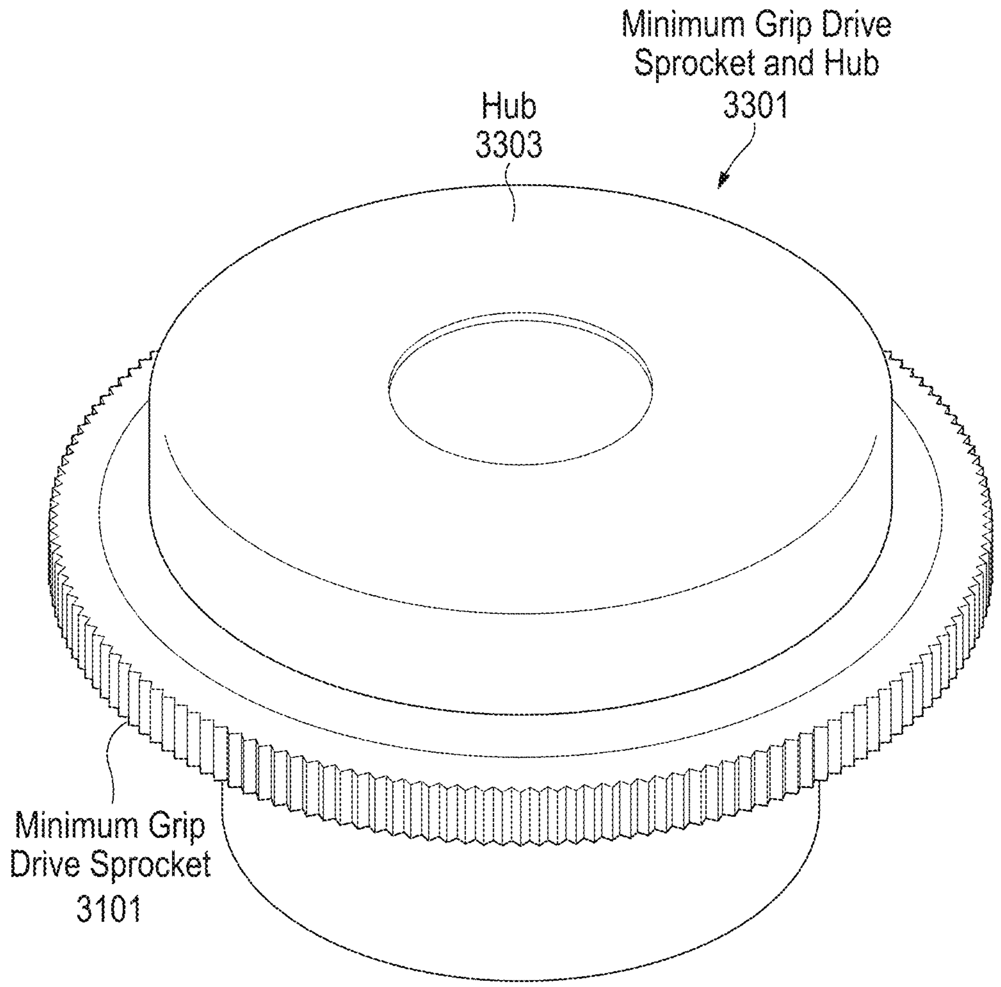
FIG. 16 shows an inclined view of the first example of a minimum grip drive sprocket and a minimum grip drive sprocket attached to a hub.

FIG. 16 shows an inclined view of the first example of a minimum grip drive sprocket 3101 attached to a hub 3303. Here the minimum grip drive sprocket 3101 is welded in spots to the hub 3303. This allows a flexible positioning of the minimum grip drive sprocket 3101, as it may be attached at various positions along the hub 3303 surface. Alternatively the hub and minimum grip drive sprocket may be formed as one piece. Also the minimum grip drive sprocket may be attached to the hub by any equivalent method known to those skilled in the art in the various positions along the hub or continuously.

Figure 17:
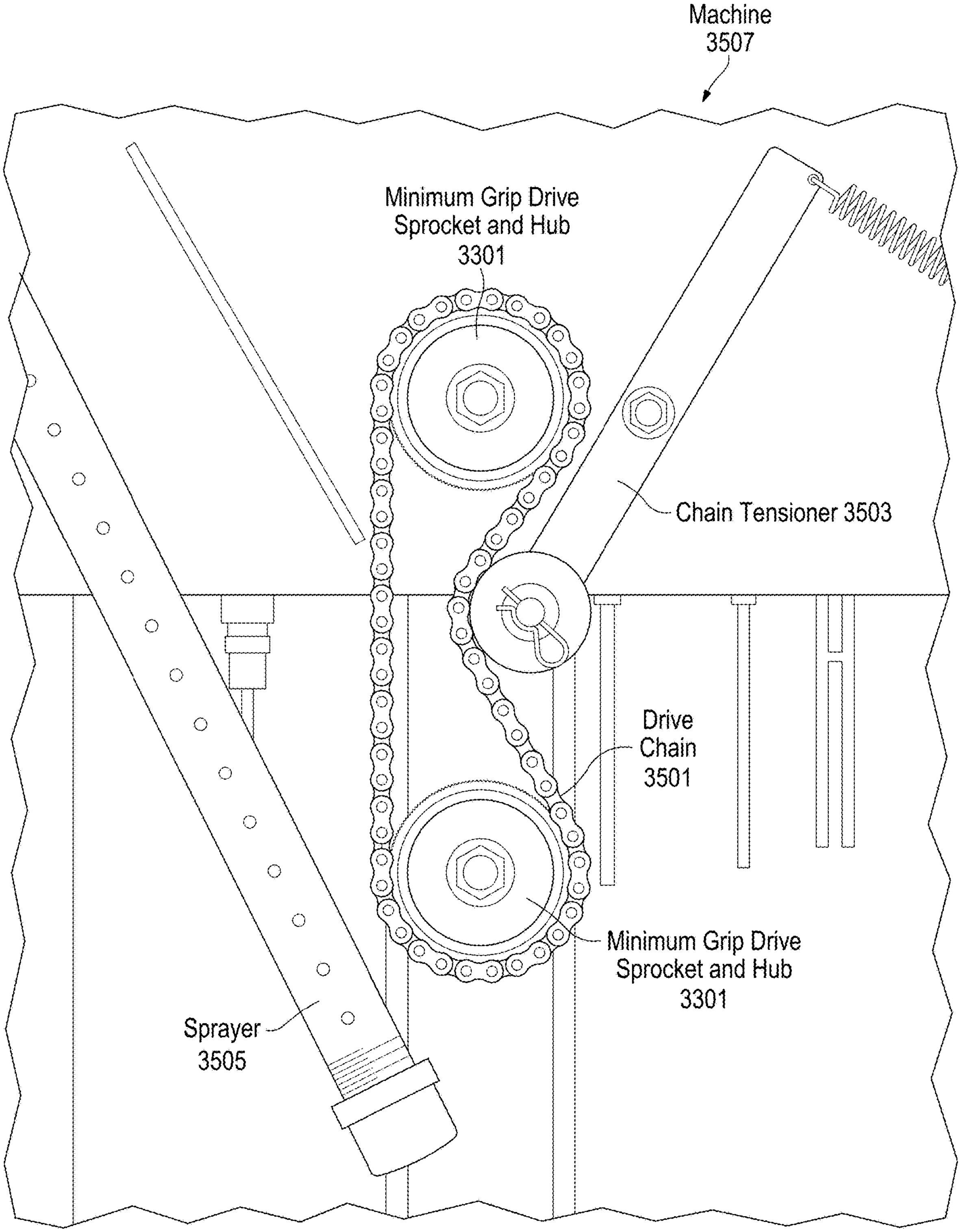
FIG. 17 shows the first example of a minimum grip drive sprocket in use.

FIG. 17 shows the first example of a minimum grip drive sprocket in use in a machine such as an exemplary parts washer 3507. Here two minimum grip drive sprockets and hubs 3301 are coupled via a drive chain 3501. A chain tensioner 3503 is provided to take out slack that may be present in the chain, typically through mechanical bias such as a spring or the like. It will be noted that a clutch is not present in the drive train as it is not needed since the slippage in the minimum grip drive sprocket and hub 3301, make a clutch unnecessary should a jam occur in the drive train 3301, 3501 where one component stops rotating or "locks". The chain will continue to move as it loses traction on the hub that has ceased turning.

Here the two minimum grip drive sprockets are shown as identical. However, this need not be the case as different diameters or sizes may be used as well as more minimum grip drive sprockets as called for in a given application. Also a single minimum grip drive sprocket may be used in conjunction with other types of minimum grip drive sprockets if desired. In use a slick environment may be present due to a solvent sprayed by sprayer 3505 within the machine 3507. If a belt and pulley were used, even with a tensioning device 3503 excessive belt slippage is more likely to occur than the arrangement using a minimum grip drive sprocket 3301.

Figure 8:
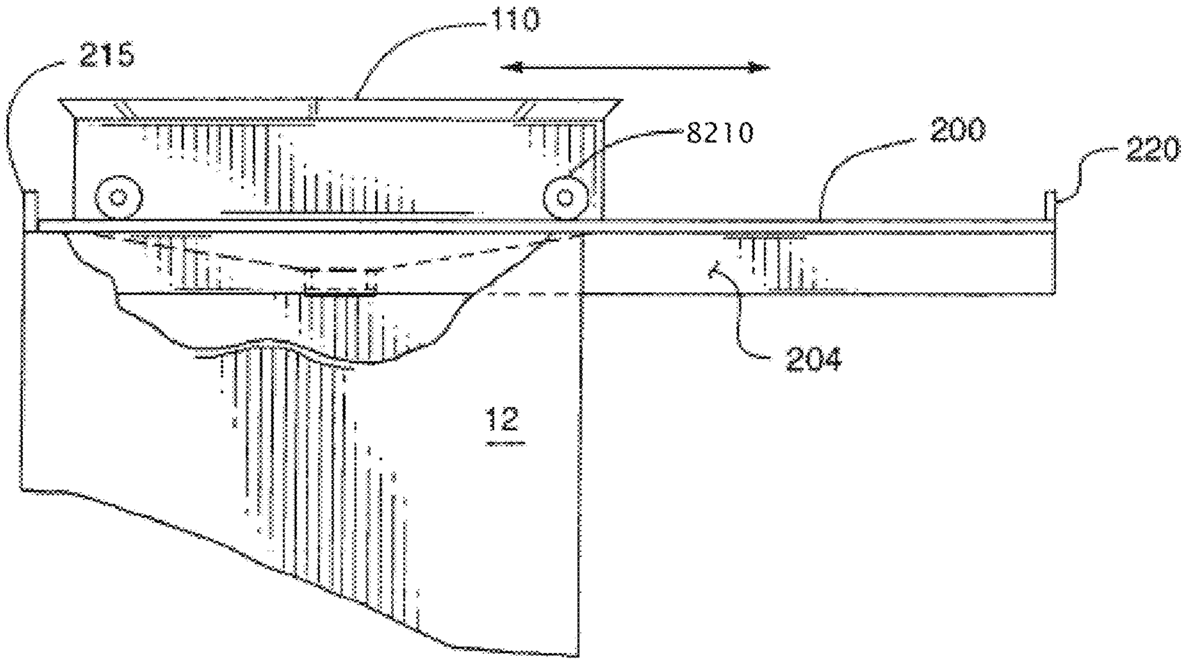
FIG. 8 is a front view of still another example of the parts washer sink and cabinet.
Figure 18:
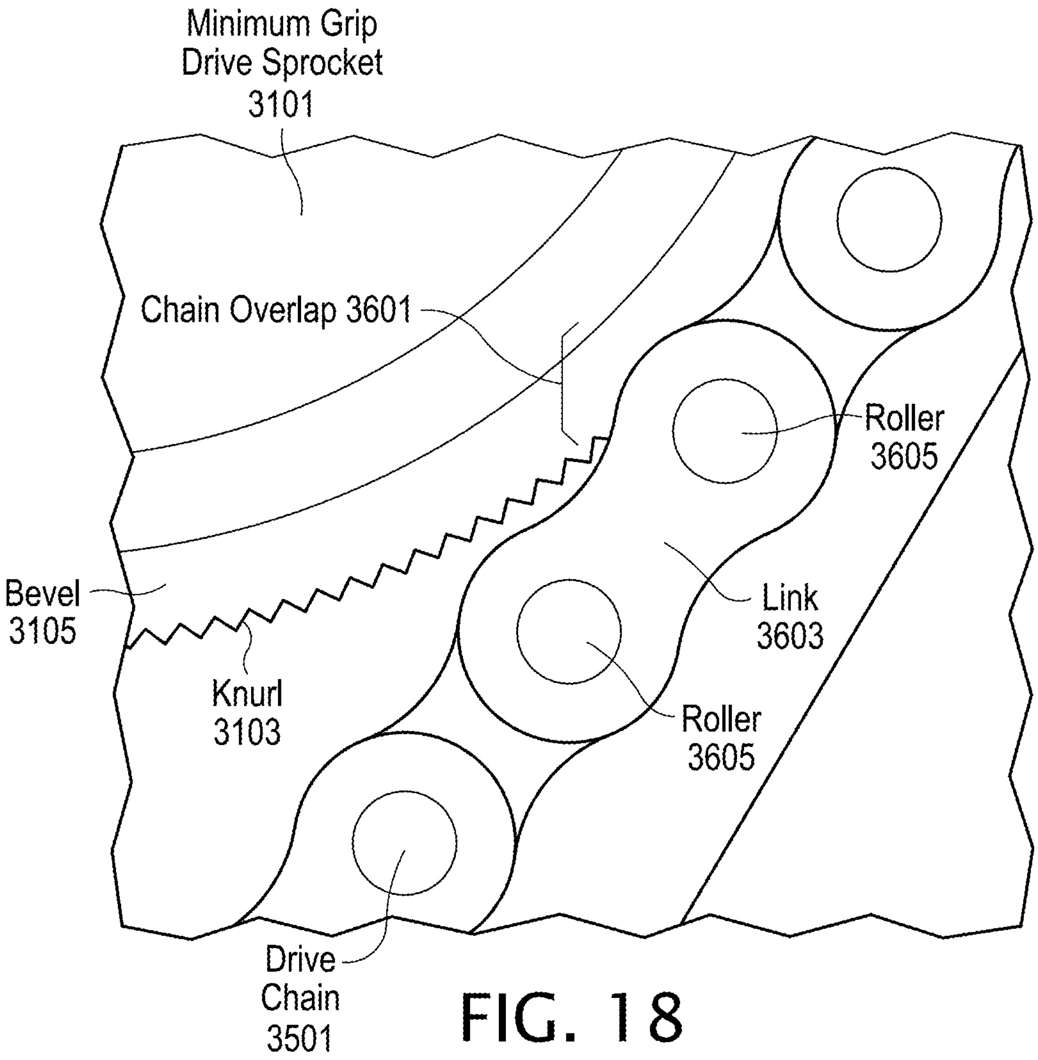
FIG. 18 shows a close up view of a chain and the first example of a minimum grip drive sprocket.

FIG. 18 shows a close up view of a chain and the first example of a minimum grip drive sprocket 3101 used in the machine of FIG. 8. The fitting of the minimum grip drive sprocket 3101 between drive chain links 3603 tends to keep the drive chain 3501 from jumping off of the minimum grip drive sprocket 3101, especially when traction against the knurled surface 3103 may be lost. If a typical exemplary bicycle sprocket (not shown) were used the chain would be kept in place by teeth extending through gaps between chain rollers, but the chain would be locked in place by the sprocket teeth engaging gaps between chain rollers.

The bevel 3105 allows the knurled surface 3103 to extend between the links and contact the chain rollers 3605. The chain 3501 has an overlap 3601 allowed by the bevel 3105. In alternative examples a minimum grip drive sprocket may be made of a uniform thickness sufficient to fit between the links 3603. In further alternative examples the bevel 3105, instead of being a uniform slope may be a step or other suitable shape so that the knurl 3103 may reach and engage rollers 3605.

Figure 19:
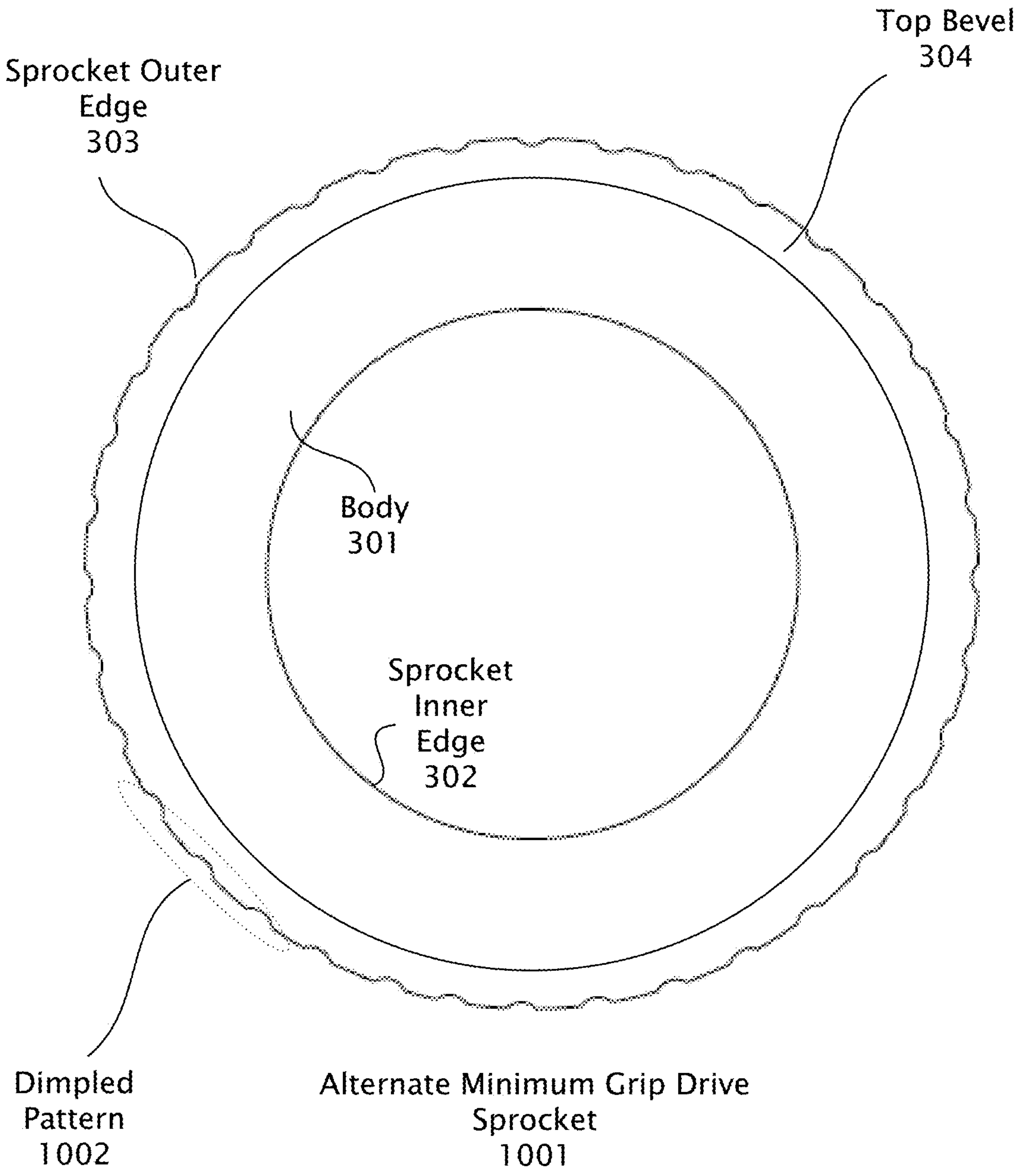
FIG. 19 is a top view of a second example of the minimum grip drive sprocket.

FIG. 19 is a top view of a second example of the minimum grip drive sprocket 1001. The second example of a minimum grip drive sprocket may be constructed as previously described. However, instead of a knurled pattern about the minimum grip drive sprocket perimeter, a dimpled pattern 1002 may be utilized to provide a rough surface and to clear fouling by dirt and grease in the same way that the previously described knurling does. Except for the dimpled pattern 1002 all other parts are constructed as previously described.

It will be seen that the present invention provides a unique, efficient parts washer. Because of the compactness of design and its ability to be used as both a manual sink, an automatic jet washer and an undercarriage parts cleaner. As such, the washer of the present invention replaces several units in the shop area providing substantial economy to the shop operator. The washer is mobile and may be transported to a work location as beneath a lift or hoist to assist a mechanic working on a brake system. Both jet and manual cleaning can be accomplished at the same time with the same unit further increasing efficiency of the mechanic and increasing profitability.

It will be obvious to those skilled in the art to make various changes, alterations and modifications to the invention described herein. To the extent such changes, alterations and modifications do not depart from the spirit and scope of the appended claims, they are intended to be encompassed therein.

The invention claimed is:

1. A portable multi-function parts washer for removing contaminants from parts either by hand or automatically using an aqueous cleaning fluid, the parts washer comprising:

a base cabinet having sides and an open top defining a compartment having a spray cleaning section;

a horizontally rotating cleaning receptacle mounted in the spray cleaning section for receiving parts to be washed by jet cleaning, the horizontally rotating cleaning receptacle attached to a vertical drive shaft, the vertical drive shaft being driven by a drive mechanism including at least one minimum grip drive sprocket;

a spray manifold in the spray cleaning section having at least one spray nozzle oriented to direct a cleaning spray toward the horizontally rotating cleaning receptacle;

a fluid pump having an outlet and an inlet;

a sink mounted on the cabinet open top overlying the spray cleaning section having a closed position closing the cabinet open top and an open position providing access to the spray cleaning section to load and remove parts therefrom;

a hand washer for manually cleaning parts in the sink;

a drain in the sink;

a fluid reservoir in the lower section of the cabinet receiving the aqueous cleaning fluid discharged from the sink through the drain and receiving the fluid discharged from the jet cleaning section; and the fluid pump inlet in fluid communication with the reservoir and the fluid pump outlet in fluid communication with the spray manifold and the parts washer to supply a pressurized aqueous cleaning fluid to the hand washer and the spray manifold exclusively from the reservoir independent of any external fluid supply.

2. The portable multi-function parts washer for removing contaminants from parts either by hand or automatically using an aqueous cleaning fluid, the parts washer of claim 1, in which the drive mechanisim includes:

a gear motor having an output shaft;

a first hub coupled to the output shaft;

a first minimum grip drive sprocket attached to the first hub;

a second hub attached to the vertical drive shaft;

a second minimum grip drive sprocket attached to the second hub;

a drive chain encircling the first minimum grip drive sprocket and the second minimum grip drive sprocket; and whereby the gear motor turns the shaft while allowing a partial slippage of the drive chain.

3. The portable multi-function parts washer for removing contaminants from parts either by hand or automatically using an aqueous cleaning fluid, the parts washer of claim 2, further comprising a chain tensioner to control the partial slippage of the drive chain.

4. The portable multi-function parts washer for removing contaminants from parts either by hand or automatically using an aqueous cleaning fluid, the parts washer of claim 1, in which the horizontally rotating cleaning receptacle is a basket.

5. The portable multi-function parts washer for removing contaminants from parts either by hand or automatically using an aqueous cleaning fluid, the parts washer of claim 1, in which the at least one minimum grip drive sprocket includes:

a circular metal ring having a uniform thickness over a body portion and having a flat top side and a flat bottom side;

a top circular bevel extending from an outer edge of the flat top side to a first outer edge of reduced thickness, a bottom circular bevel extending from an outer edge of the flat bottom side to a second outer edge of reduced thickness whereby an outer edge has a height less than the thickness and extending around the outer circumference of the circular metal ring is formed by the top and the bottom bevel; and a knurled surface treatment applied to the outer edge.

6. The portable multi-function parts washer for removing contaminants from parts either by hand or automatically using an aqueous cleaning fluid, the parts washer of claim 1, in which the at least one minimum grip drive sprocket includes:

a flat ring shaped sprocket body of a thickness with a center aperture, a top side, and a bottom side;

a beveled ring area surrounding the ring shaped sprocket body reducing the thickness of the body evenly from each side to a reduced thickness outer sprocket edge; and a knurled surface disposed on the outer sprocket edge.

7. The portable multi-function parts washer for removing contaminants from parts either by hand or automatically using an aqueous cleaning fluid, the parts washer of claim 1, wherein the sink is hinged to the base cabinet.

8. The portable multi-function parts washer for removing contaminants from parts either by hand or automatically using an aqueous cleaning fluid, the parts washer of claim 1, wherein the hand washer includes a brush and a valve to regulate a fluid flow.

9. The portable multi-function parts washer for removing contaminants from parts either by hand or automatically using an aqueous cleaning fluid, the parts washer of claim 1, wherein a dampening closer extends between the sink and cabinet.

10. The portable multi-function parts washer for removing contaminants from parts either by hand or automatically using an aqueous cleaning fluid, the parts washer of claim 1, wherein the pump is driven by an electric motor in a circuit having a safety interlock permitting operation of the motor only when the sink is in a closed position.

11. The portable multi-function parts washer for removing contaminants from parts either by hand or automatically using an aqueous cleaning fluid, the parts washer of claim 10, wherein the circuit is connected to an electrical heater located in the reservoir.

12. A portable multi-function parts washer for removing contaminants from parts either by hand or automatically using an aqueous cleaning fluid, the parts washer comprising:

- a base cabinet having sides and an open top defining a compartment having an upper jet cleaning section and a lower section;
- a rotating cleaning basket mounted in the jet cleaning section for receiving parts to be washed by jet cleaning, attached to a vertical drive shaft, the vertical drive shaft being driven by at least one minimum grip drive sprocket coupled to the vertical drive shaft;
- a spray manifold in the jet cleaning section having at least one spray nozzle oriented to direct a cleaning spray toward the rotating cleaning basket;
- a fluid pump having an outlet and an inlet;
- a sink mounted on the cabinet open top overlying the jet cleaning section having a closed position closing the cabinet open top and an open position providing access to the jet cleaning section to load and remove parts therefrom;
- a hand washer for manually cleaning parts in the sink;
- a drain in the sink;
- a fluid reservoir in the lower section receiving the fluid discharged from the sink through the drain, and receiving the fluid discharged from the jet cleaning section; and
- the fluid pump inlet in fluid communication with the reservoir and having the fluid pump outlet in fluid communication with the manifold and the sink washer to supply pressurized cleaning fluid to the hand washer and the spray manifold exclusively from the reservoir independent of any external fluid supply.

13. The portable multi-function parts washer for removing contaminants from parts either by hand or automatically using an aqueous cleaning fluid, the parts washer of claim 12 in which the at least one minimum grip drive sprocket further comprises a second minimum grip drive sprocket coupled to the at least one minimum grip drive sprocket by a drive chain.

14. The portable multi-function parts washer for removing contaminants from parts either by hand or automatically using an aqueous cleaning fluid, the parts washer of claim 12 in which the vertical drive shaft is disposed in a bearing assembly.

15. The portable multi-function parts washer for removing contaminants from parts either by hand or automatically using an aqueous cleaning fluid, the parts washer of claim 12 in which the at least one minimum grip drive sprocket is coupled to the shaft by a hub.

16. The portable multi-function parts washer for removing contaminants from parts either by hand or automatically using an aqueous cleaning fluid, the parts washer of claim 12, in which the at least one minimum grip drive sprocket includes:

- a flat ring shaped sprocket body of a thickness with a center aperture, a top side, and a bottom side;
- a beveled ring area surrounding the flat ring shaped sprocket body reducing the thickness of the flat ring shaped sprocket body evenly from each side to a reduced thickness outer sprocket edge; and
- a knurled surface disposed on the outer sprocket edge.

17. The portable multi-function parts washer for removing contaminants from parts either by hand or automatically using an aqueous cleaning fluid, the parts washer of claim 16, in which the knurled surface is a series of alternating vertical ridges and groves.

18. The portable multi-function parts washer for removing contaminants from parts either by hand or automatically using an aqueous cleaning fluid, the parts washer of claim 16, in which the knurled surface is a crosshatched pattern.

19. A portable multi-function parts washer for removing contaminants from parts either by hand or automatically using an aqueous cleaning fluid, the parts washer comprising:

- a base cabinet having sides and an open top defining a compartment having an upper jet cleaning section and a lower section;
- a horizontally rotating cleaning basket disposed in the jet cleaning section for receiving parts to be washed by jet cleaning, attached to a vertical drive shaft, the vertical drive shaft being driven by a minimum grip sprocket drive system, the minimum grip sprocket drive system including:
  - a first hub attached to the shaft;
  - a first minimum grip drive sprocket having a first knurled outer circumference attached to the hub, the hub inserted into a first aperture in the first minimum grip drive sprocket;
  - a second hub attached to a motor drive shaft;
  - a second minimum grip drive sprocket having a second knurled outer circumference attached to the second hub, the second hub inserted into a first aperture in the second minimum grip drive sprocket; and
  - a drive chain coupling the first minimum grip drive sprocket to the second minimum grip drive sprocket;
- a spray manifold in the jet cleaning section having at least one spray nozzle oriented to direct a cleaning spray toward the rotating cleaning basket;
- a fluid pump having an outlet and an inlet;
- a sink mounted on the cabinet open top overlying the jet cleaning section having a closed position closing the cabinet open top and an open position providing access to the jet cleaning section to load and remove parts therefrom;
- a hand washer for manually cleaning parts in the sink;
- a drain in the sink;
- a fluid reservoir in the lower section of the cabinet receiving the fluid discharged from the sink through the drain and receiving the fluid discharged from the jet cleaning section; and
- the fluid pump inlet in fluid communication with the reservoir and having the fluid pump outlet in fluid communication with the spray manifold and the sink washer to supply pressurized aqueous cleaning fluid to the hand washer and the spray manifold exclusively from the reservoir independent of any external fluid supply.

20. The portable multi-function parts washer for removing contaminants from parts either by hand or automatically using an aqueous cleaning fluid, the parts washer of claim 19, in which the first knurled outer circumference, and the second knurled outer circumference surface are a series of alternating vertical ridges and groves.

* * * * *